(12) United States Patent
Mehrab et al.

(10) Patent No.: US 10,311,254 B2
(45) Date of Patent: Jun. 4, 2019

(54) ELECTRONIC APPARATUS AND INFORMATION ACCESS CONTROL METHOD THEREOF

(71) Applicant: Samsung Electronics Co., Ltd., Suwon-si, Gyeonggi-do (KR)

(72) Inventors: A. K. M. Fazla Mehrab, Mymensingh (BD); Kazy Fayeen Shariar, Dacca (BD); Sadik Noman, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/000,632

(22) Filed: Jan. 19, 2016

(65) Prior Publication Data
US 2016/0210467 A1    Jul. 21, 2016

(30) Foreign Application Priority Data
Jan. 16, 2015 (KR) .................. 10-2015-0007894

(51) Int. Cl.
*G06F 21/62* (2013.01)
(52) U.S. Cl.
CPC ........ *G06F 21/629* (2013.01); *G06F 21/6245* (2013.01)
(58) Field of Classification Search
CPC .................. G06F 21/1629; G06F 21/6245
See application file for complete search history.

(56) References Cited

U.S. PATENT DOCUMENTS

| 7,657,849 | B2* | 2/2010 | Chaudhri | G06F 3/04883 |
| | | | | 715/863 |
| 8,732,617 | B1* | 5/2014 | Armstrong | G06F 3/04817 |
| | | | | 715/711 |
| 8,935,633 | B2* | 1/2015 | Bush | G06F 21/6209 |
| | | | | 709/207 |
| 8,958,854 | B1* | 2/2015 | Morley | H04M 1/72563 |
| | | | | 370/311 |
| 9,195,388 | B2* | 11/2015 | Shepherd | G06F 3/0482 |
| 9,298,361 | B2* | 3/2016 | Shepherd | G06F 3/0482 |
| 9,420,608 | B2* | 8/2016 | Jamadagni | H04W 4/005 |
| 9,451,458 | B2* | 9/2016 | Cotterill | G06F 21/35 |
| 10,152,216 | B2* | 12/2018 | Kim | G06F 3/0488 |
| 2003/0131094 | A1* | 7/2003 | Awada | G06F 9/468 |
| | | | | 709/224 |

(Continued)

OTHER PUBLICATIONS

How to Geek ("Allow Users to Run Only Specified Programs in Windows 7," retrieved from https://web.archive.org/web/20100109120910/https://www.howtogeek.com/howto/8739/restrict-users-to-ru n-only-specified-programs-in-windows-7/, Jan. 9, 2010, pp. 1-3).*

(Continued)

*Primary Examiner* — Luu T Pham
*Assistant Examiner* — James J Wilcox
(74) *Attorney, Agent, or Firm* — Jefferson IP Law, LLP

(57) ABSTRACT

An electronic apparatus and an information access control method thereof are provided. The information access control method includes receiving a user input for a first application on a touch screen, and limiting execution of at least some of remaining applications except for the first application of the electronic apparatus when the user input is a preset first information access control mode input.

19 Claims, 29 Drawing Sheets

(56) References Cited

U.S. PATENT DOCUMENTS

| | | | | |
|---|---|---|---|---|
| 2004/0128382 A1* | 7/2004 | Shimoda | H04W 52/00 | 709/225 |
| 2005/0060565 A1* | 3/2005 | Chebolu | H04L 63/102 | 726/26 |
| 2008/0174570 A1* | 7/2008 | Jobs | G06F 3/0488 | 345/173 |
| 2009/0083850 A1* | 3/2009 | Fadell | G06F 21/316 | 726/19 |
| 2009/0240861 A1* | 9/2009 | Pan | G09B 7/02 | 710/267 |
| 2010/0037224 A1* | 2/2010 | Hosoda | G06F 9/485 | 718/100 |
| 2010/0162182 A1* | 6/2010 | Oh | G06F 3/04883 | 715/863 |
| 2010/0231383 A1* | 9/2010 | Levine | H04W 52/0261 | 340/540 |
| 2011/0305294 A1* | 12/2011 | Moriya | H04W 52/0216 | 375/295 |
| 2012/0023573 A1* | 1/2012 | Shi | G06F 3/04883 | 726/17 |
| 2012/0071151 A1* | 3/2012 | Abramson | H04L 67/12 | 455/418 |
| 2012/0221877 A1* | 8/2012 | Prabu | H04W 52/0235 | 713/340 |
| 2012/0304280 A1* | 11/2012 | Hayashida | G06F 21/6218 | 726/16 |
| 2013/0016690 A1* | 1/2013 | Jeong | H04W 24/10 | 370/329 |
| 2013/0042209 A1* | 2/2013 | de Leon | G06F 3/017 | 715/863 |
| 2013/0111408 A1* | 5/2013 | Berus | G06Q 10/10 | 715/835 |
| 2013/0113436 A1* | 5/2013 | Ishibashi | H02J 7/0013 | 320/136 |
| 2013/0283199 A1* | 10/2013 | Selig | G06F 3/0484 | 715/781 |
| 2015/0020035 A1* | 1/2015 | Liang | G06F 3/04883 | 715/863 |
| 2015/0040243 A1* | 2/2015 | Mittal | G06F 21/604 | 726/27 |
| 2015/0047014 A1* | 2/2015 | Yoon | G06F 21/36 | 726/16 |
| 2015/0056974 A1* | 2/2015 | Kim | G06F 9/4443 | 455/418 |
| 2015/0057052 A1* | 2/2015 | Eo | H04W 52/0251 | 455/574 |
| 2015/0067873 A1* | 3/2015 | Kihara | G06F 21/6281 | 726/26 |
| 2015/0254444 A1* | 9/2015 | Herger | G06F 21/32 | 726/19 |
| 2016/0099930 A1* | 4/2016 | Minovski | H04L 63/083 | 726/5 |
| 2016/0252944 A1* | 9/2016 | Kim | G06F 1/28 | 713/340 |
| 2016/0253187 A1* | 9/2016 | Kim | G06F 9/44505 | 719/320 |

OTHER PUBLICATIONS

King et al "Executing Resource Intensive Applications on Mobile Devices," ACM SE '10 Proceedings of the 48th Annual Southeast Regional Conference, Article No. 86, Apr. 15-17, 2010, pp. 1-2.*

* cited by examiner

ELECTRONIC APPARATUS AND INFORMATION ACCESS CONTROL METHOD THEREOF

CROSS-REFERENCE TO RELATED APPLICATION(S)

This application claims the benefit under 35 U.S.C. § 119(a) of a Korean patent application filed on Jan. 16, 2015 in the Korean Intellectual Property Office and assigned Serial number 10-2015-0007894, the entire disclosure of which is hereby incorporated by reference.

TECHNICAL FIELD

The present disclosure relates to an electronic apparatus that limits the access of information to other people by limiting the provision of an application or content of the application according to a user input, and an information access control method thereof.

BACKGROUND

Portable terminals support particular user functions and are small enough to be carried, and thus are widely used in many areas of industry and daily life. Recently-introduced portable terminals support various user functions in an integrated manner. Such a portable terminal provides a screen, which corresponds to a user function, through a display unit while supporting the relevant user function. Accordingly, the user can enjoy content on a screen according to the execution of a particular user function while using the relevant user function.

Currently, with the progress of digital technology, electronic apparatuses capable of providing various applications and various pieces of content, such as mobile communication terminals, personal digital assistants (PDAs), electronic organizers, smart phones, tablet personal computers (PCs), and the like, have been released in the market.

For security reasons, such an electronic apparatus can operate a lock mode, which requires user authentication, according to a user's setting or a characteristic at the time of manufacturing the electronic apparatus. The user can control some or all of the functions of the electronic apparatus by changing the electronic apparatus to a locked state through a particular input. Therefore, the electronic apparatus, for which a lock mode is set, can be controlled such that other people cannot use the electronic apparatus without performing user authentication, such as a password, a particular pattern, fingerprint recognition, and the like.

In some cases, the user of the electronic apparatus may temporarily leave the electronic apparatus with another person in order to share a particular application or particular content with another person. In this case, it is problematic that another person may identify data through a simple manipulation, that the user of the electronic apparatus does not intend to share and thus the data, that the user of the electronic apparatus does not intend to share, may be exposed to another person.

Also, according to the related art, when a locked state of the electronic apparatus is first released by user authentication by the user of the electronic apparatus, another person can freely view information within the electronic apparatus. Accordingly, it is problematic that the user of the electronic apparatus cannot limitedly disclose to another person, information of a particular application or particular content embedded or stored in the electronic apparatus.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus that can limitedly control the access of information by executing an application in an information access control mode, and an information access control method thereof.

In accordance with an aspect of the present disclosure, a method for controlling access of information by an electronic apparatus is provided. The method includes receiving a user input for a first application on a touch screen, and limiting execution of at least some of remaining applications except for the first application of the electronic apparatus when the user input is a preset first information access control mode input.

In accordance with another aspect of the present disclosure, an electronic apparatus is provided. The electronic apparatus includes a touch screen, and a control unit for receiving a user input for a first application through the touch screen, configured to limit execution of at least some of remaining applications except for the first application of the electronic apparatus when the user input is a preset first information access control mode input.

According to various embodiments of the present disclosure, the user of the electronic apparatus can prevent a particular application and/or particular content that the user of the electronic apparatus does not intend to provide, from being provided to another person by executing the particular application in an information access control mode on the basis of a user input.

In the case where the locked state of the electronic apparatus is released, the input of a signal which attempts to use an application and/or content other than an allowed application or content, can be detected and a lock function can be provided so that private information can be effectively protected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Figure 1:
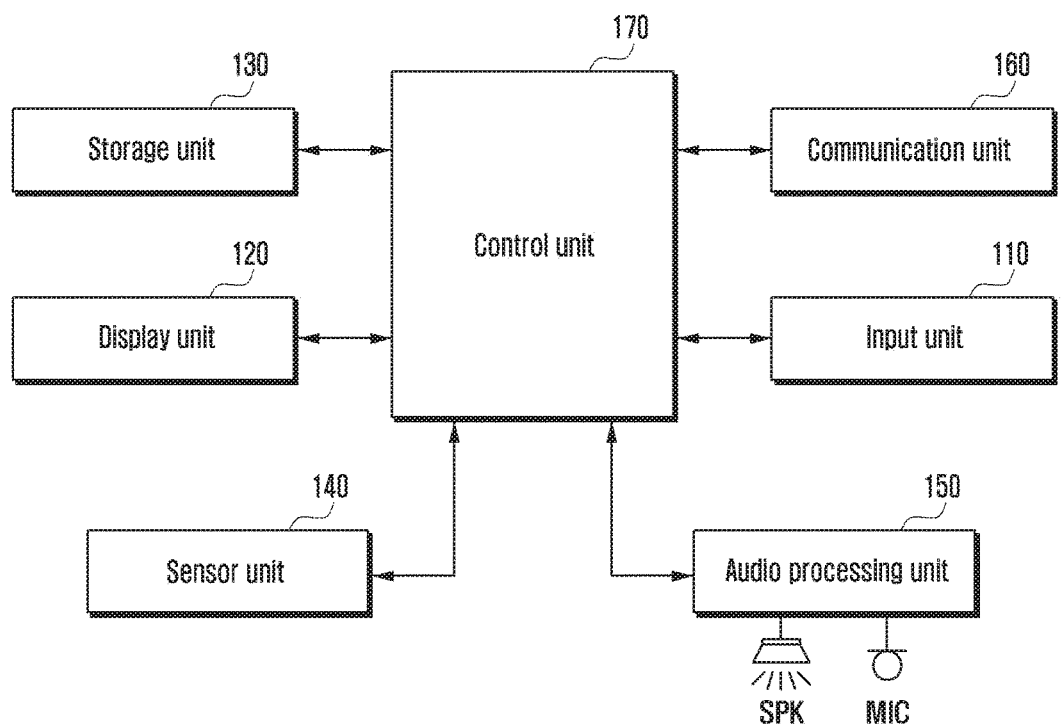
FIG. 1 is a block diagram illustrating a configuration of an electronic apparatus according to an embodiment of the present disclosure.

FIG. 1 is a block diagram illustrating a configuration of an electronic apparatus according to an embodiment of the present disclosure.

Referring to FIG. 1, an electronic apparatus 100, according to an embodiment of the present disclosure, may include an input unit 110, a display unit 120, a storage unit 130, a sensor unit 140, an audio processing unit 150, a communication unit 160, and a control unit 170.

Referring to FIG. 1, the electronic apparatus 100, according to an embodiment of the present disclosure, includes the elements illustrated in FIG. 1 which may not be essential elements, and thus may be implemented with a greater or fewer number of elements than those illustrated in FIG. 1.

In various embodiments of the present disclosure, an information access control mode may be a mode for operating an application and/or providing content of the application that an owner of the electronic apparatus 100 sets so as to enable only particular information to be provided to another person. For example, in the information access control mode, the electronic apparatus 100 may provide a user with only a particular application and/or particular content.

For example, a first information access control mode may be a mode for controlling the access of information between applications according to the execution of the applications, and a second information access control mode may be a mode for controlling the invention of content which is generated by a particular application and is stored therein.

In various embodiments of the present disclosure, an information access control mode input may be an input that the user presets so as to enable an application and/or content of the application to be provided in an information access control mode. For example, a first information access control mode input may be an input for executing the first information access control mode, and a second information access control mode input may be an input for executing the second information access control mode.

In various embodiments of the present disclosure, a normal mode may be a mode for operating an application and/or providing content of the application that the owner of the electronic apparatus 100 sets so as to enable all pieces of information of the electronic apparatus 100 to be provided to another person. For example, in the normal mode, the electronic apparatus 100 may, at a request of a user, unlimitedly provide the user with all applications thereof and/or all pieces of content of all the applications thereof.

In various embodiments of the present disclosure, a lock function may be a function of operating the electronic apparatus 100 in such a manner that an optional input signal does not cause the electronic apparatus 100 to operate. The lock function may be released through an input from the user, for example, user authentication such as a particular pattern, a password, biometric information, and the like. The electronic apparatus 100 may functionally perform the lock function and simultaneously may display a preset lock screen, and thereby may notify the user that the lock function is being performed.

In various embodiments of the present disclosure, a lock mode may signify an operating state of the electronic apparatus 100 for which the lock function is set. In this case, the lock mode and the locked state may have the same meaning in terms of functionality.

In various embodiments of the present disclosure, private content may be content that the user of the electronic apparatus 100 sets so as not to be shared with another person. The electronic apparatus 100 may add an identifier to the particular content, which enables the particular content to be recognized from among pieces of content of applications as private content. The electronic apparatus 100 may provide the user with a selection screen on which the user may set as private content, at least one piece of content among pieces of content stored in the electronic apparatus 100.

In various embodiments of the present disclosure, public content may be content which is set such that the content can be disclosed to another person. The electronic apparatus 100 may add an identifier to the particular content, which enables the particular content to be recognized from among the pieces of content of the applications as public content. The electronic apparatus 100 may provide the user with a selection screen on which the user may set as public content, at least one piece of content among the pieces of content stored in the electronic apparatus 100.

In various embodiments of the present disclosure, private content and public content are identified in order to specify content which may be displayed in an information access control mode, according to an embodiment of the present invention. All of the pieces of content may not be classified into private content and public content. For example, content of an application may be normal content which is neither private content nor public content. When the content is neither private content nor public content, in order to determine whether the relevant content is displayed in the information access control mode, the electronic apparatus 100 may receive an input from the user as the need arises.

The input unit 110 may include multiple input keys and function keys that can receive, as a user input, numeric or character information and can set various functions. The function keys may include arrow keys, side keys, hot keys, and the like, which are set to perform particular functions. The input unit 110 may generate a key signal which is input in relation to a user's setting and the control of a function of the electronic apparatus 100, and may deliver the generated key signal to the control unit 170. The input unit 110 may be implemented by a touch screen or may include a touch screen. The touch screen may be implemented by a liquid crystal display (LCD), an organic light emitting diode (OLED) display, and the like. For example, the input unit 110 may include a panel, a sheet, a digitizer, and the like, that can receive a typical touch input, a proximity touch input, a gesture input, an input from an electronic pen, and the like.

According to various embodiments of the present disclosure, the input unit 110 may receive an input according to the selection of a particular application item by the user, may generate a selection signal corresponding to the selection of the particular application, and may deliver the generated selection signal to the control unit 170. The input unit 110 may also receive an input according to the selection of particular content of an application by the user, may generate a selection signal corresponding to the selection of the particular content, and may deliver the generated selection signal to the control unit 170. The particular application item and/or the particular content may be displayed by the display unit 120 so as to be easily selected by the user.

According to various embodiments of the present disclosure, examples of the particular application may include applications embedded in the electronic apparatus 100 and various applications included in an external apparatus. When an application is included in an external apparatus, the electronic apparatus 100 may receive the relevant application provided by the external apparatus in a streaming scheme. In addition, the electronic apparatus 100 may display link information which enables the reception of the relevant application, through the display unit 120.

According to various embodiments of the present disclosure, the input unit 110 may receive from a user, an input for executing a particular function of an application during the execution of the application. The input unit 110 may generate a signal for executing the relevant function according to the received input, and may deliver the generated signal to the control unit 170. The input unit 110 may also receive from a user, an input for terminating an application or an input for executing another application during the execution of the application. Accordingly, the input unit 110 may generate a signal according to the relevant input and may deliver the generated signal to the control unit 170.

The display unit 120 may display various screens generated during an operation of the electronic apparatus 100. The display unit 120 may receive from the control unit 170, a display control signal over a particular screen and may output the received display control signal on the screen. For example, the display unit 120 may provide a screen interface such as a home screen, an idle screen, a menu screen, a telephone call screen, and the like. The display unit 120 may be implemented by a touch screen, and the screen of the display unit 120 may serve as the input unit 110 when the display unit 120 is implemented by the touch screen.

According to various embodiments of the present disclosure, the display unit 120 may display whether an application and/or content of the application is being provided in an information access control mode. For example, when the application or the content of the application is being provided in the information access control mode, the display unit 120 may display a related user interface (UI) item. Based on the display of the related UI item, the user may determine whether the application currently being executed or the content currently being displayed is being provided in the information access control mode.

According to various embodiments of the present disclosure, the display unit 120 may display a lock screen according to the execution of a lock function of the electronic apparatus 100. The lock screen may be a screen which is set at the time of manufacturing the electronic apparatus 100, or screens which may be variously set by the user.

The storage unit 130 may store commands or data received from the control unit 170 or the other elements. The storage unit 130 may store commands or data generated by the control unit 170 or the other elements. The storage unit 130 may include programming modules, such as a kernel, middleware, an application programming interface (API), an application, and the like. Each of the above-described programming modules may be implemented in software, firmware, hardware, or a combination of two or more thereof.

According to various embodiments of the present disclosure, the storage unit 130 may store user input information for providing an application and/or content of the application in an information access control mode. In this case, the user input information may be an information access control mode input. The user may set the electronic apparatus 100 so as to recognize a particular input as an information access control mode input, and the electronic apparatus 100 may store the information which is set by the user, in the storage unit 130.

According to an embodiment of the present disclosure, the storage unit 130 may store various data which may be generated while an application is executed in the information access control mode. According to an embodiment of the present disclosure, under the control of the control unit 170, the storage unit 130 may add an identifier to at least one piece of content which enables the at least one piece of content to be recognized as private content or public content. According to access identified by the control unit 170, the storage unit 130 may or may not deliver the stored content to the display unit 120.

The sensor unit 140 may measure a physical quantity or sense an operation state of the electronic apparatus 100 and may convert the measured physical quantity or the sensed operation state into an electric signal. The sensor unit 140 may include, for example, a global positioning system (GPS) sensor, a gesture sensor, a grip sensor, a proximity sensor, a biometric sensor, an infrared ray (IR) sensor, and the like, but is not limited thereto. The sensor unit 140 may further include a control circuit for controlling one or more sensors included therein. According to an embodiment of the present disclosure, the sensor unit 140 may recognize a user input for executing an application in the information access control mode.

The audio processing unit 150 may be configured to process various audio signals generated during an operation of the electronic apparatus 100. For example, the audio processing unit 150 may include a speaker SPK in order to support the output of an audio signal generated or decoded by the electronic apparatus 100. The audio processing unit 150 may also include a microphone MIC capable of collecting audio signals in order to support a voice call function or a video call function, a recording function, and the like. According to an embodiment of the present disclosure, the audio processing unit 150 may recognize a voice of the user as an input signal of the information access control mode. According to an embodiment of the present disclosure, the audio processing unit 150 may output voice data, such as an application, content, and the like, through the speaker.

The communication unit 160 may establish a communication connection with other electronic apparatuses or a server (not shown) connected to the electronic apparatus 100 through a network (not shown), and may transmit/receive data to/from the other electronic apparatuses or the server. The communication unit 160 may include, for example, a cellular module, a Wi-Fi module, a Bluetooth (BT) module, a GPS module, a near field communication (NFC) module, a mobile network module, and a radio frequency (RF) module. According to an embodiment of the present disclosure, the communication unit 160 may transmit/receive content which is related to an application, to/from an external apparatus such as a server and the like.

The control unit 170 may control an overall operation of the electronic apparatus 100 and a signal flow between the elements of the electronic apparatus 100, and may perform a function of processing data. The control unit 170 may be implemented by a central processing unit (CPU), an application processor (AP), and the like. The control unit 170 may control the respective elements of the electronic apparatus 100 to perform an information access control function according to an embodiment of the present disclosure.

Figure 2:
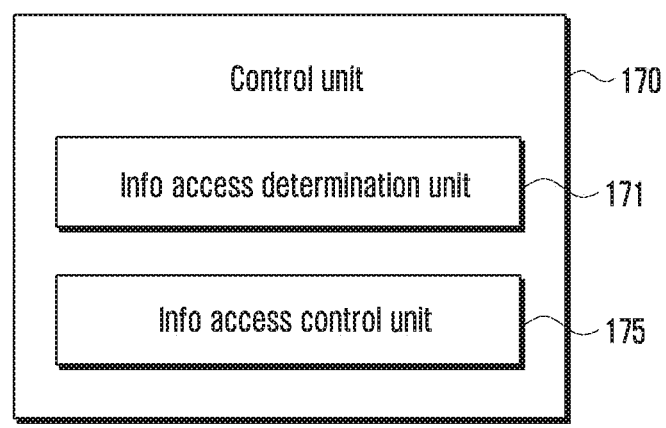
FIG. 2 is a block diagram illustrating a configuration of a control unit according to an embodiment of the present disclosure.

FIG. 2 is a block diagram illustrating a configuration of a control unit according to an embodiment of the present disclosure.

Referring to FIG. 2, the control unit 170 may include an information access determination unit 171 and an information access control unit 175. The information access determination unit 171 and the information access control unit 175 may be implemented as one module such that the former is not distinguished from the latter, and may have a configuration in which the former is distinguished from the latter in terms of their meanings, in this specification.

The information access determination unit 171 may determine whether a particular application and/or particular content of an application is provided in an information access control mode. When the information access determination unit 171 determines that a particular input is an information access control mode input, the information access control unit 175 may be activated and may limit information provided by the electronic apparatus 100. The information access determination unit 171 may determine whether the information access control mode input is a first information access control mode input or a second information access control mode input. The input unit 110 may generate a user input signal on the basis of a user input and may deliver the generated user input signal to the information access determination unit 171. The information access determination unit 171 may compare the user input signal which has been received from the input unit 110, with a preset user input signal. In the present example, the preset user input signal may be a first information access control mode input signal or a second information access control mode input signal.

According to an embodiment of the present disclosure, the information access determination unit 171 may determine what information access control mode is indicated by the input signal, and may deliver a signal to the information access control unit 175 for activating the information access control unit 175.

According to an embodiment of the present disclosure, the information access determination unit 171 may determine whether a second information access control mode input is received in relation to content of an application while the relevant content is displayed. For example, the information access determination unit 171 may determine whether a second information access control mode input related to first content of an application is received while the first content is displayed. The information access determination unit 171 may compare a user input signal related to the first content with a second information access control mode input signal stored in the storage unit 130. When the user input signal related to the first content coincides with the second information access control mode input signal stored in the storage unit 130, the information access determination unit 171 may deliver a signal to the information access control unit 175 for activating the information access control unit 175.

The information access control unit 175 may receive from the information access determination unit 171, activation information for providing a particular application and/or particular content of an application in the first information access control mode or the second information access control mode.

According to an embodiment of the present disclosure, when a user selection input for a particular application item on the touch screen is the first information access control mode input, the information access control unit 175 may limit the execution of at least some of remaining applications, except for an application corresponding to the application item. The remaining applications may be applications stored in the storage unit 130. In this case, the electronic apparatus 100 may deactivate the at least some of the remaining applications except for the particular application.

According to an embodiment of the present disclosure, the information access control unit 175 may execute the particular application in the first information access control mode. For example, the information access control unit 175 may control the electronic apparatus 100 such that an application which is currently being executed in an information access control mode, is not terminated or does not switch to another application. Accordingly, the electronic apparatus 100 may prevent another person from using an application other than the particular application which is allowed to be used by the owner of the electronic apparatus 100. The electronic apparatus 100 may also prevent the termination of the application which is currently being executed, and thereby may prevent another person from viewing an application list and the like, which are installed in the electronic apparatus 100.

According to an embodiment of the present disclosure, the information access control unit 175 may also operate the electronic apparatus 100 in a lock mode when the information access control unit 175 receives from the user, an information change request input for an application while the application is executed in the first information access control mode. In the present example, the information change request input for an application may be, for example, at least one of an input for terminating an application currently being executed, an input for switching the application currently being executed to another application, or an input for causing an application which is currently being executed in a foreground, to be executed in a background. The information access control unit 175 may display a lock screen in such a manner that the information access control unit 175 operates the electronic apparatus 100 in the lock mode and simultaneously or sequentially delivers lock screen information to the display unit 120.

According to an embodiment of the present disclosure, when a user selection input for a particular application item on the touch screen is the second information access control mode input, the information access control unit 175 may limit the provision of at least one piece of content among pieces of content related to the particular application. The information access control unit 175 may receive from the user, an information change request input for content of an application while the relevant content is displayed in the second information access control mode. In this case, the information access control unit 175 may display the relevant content according to a preset condition. In the present example, the information change request input for content may be, for example, an input for switching particular content of an application which is currently displayed, to different content of the relevant application. The preset condition may also be a condition for determining whether the different content is private content. The information access control unit 175 may control the electronic apparatus 100 to display only particular content which is allowed to be viewed by the owner of the electronic apparatus 100 on the basis of the preset condition. A specific operation of displaying the particular content according to the preset condition will be described below.

Figure 3:
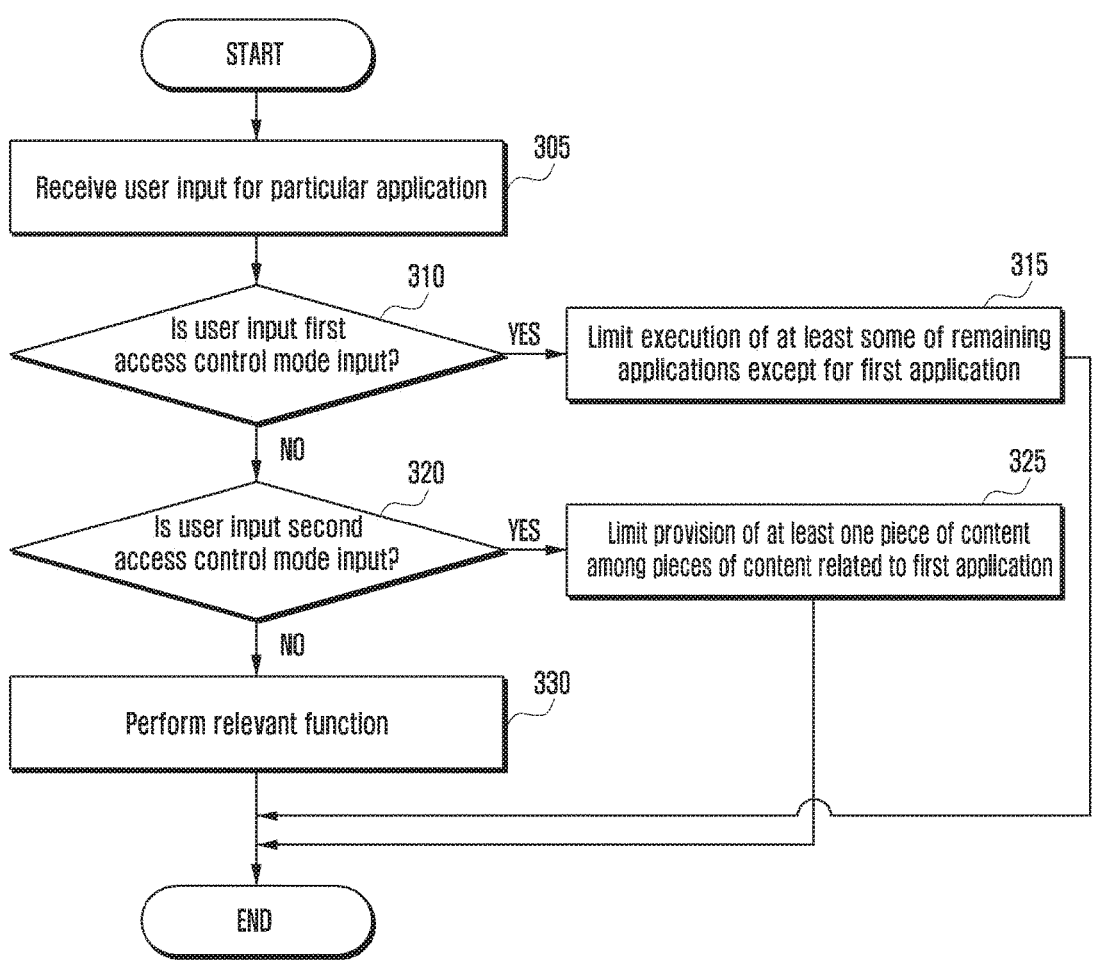
FIG. 3 is a flowchart illustrating an operation in which an electronic apparatus limits information provided thereby according to an information access control mode of an application according to an embodiment of the present disclosure.

FIG. 3 is a flowchart illustrating an operation in which an electronic apparatus limits information provided thereby according to an information access control mode of an application according to an embodiment of the present disclosure.

Referring to FIG. 3, in operation 305, the electronic apparatus 100 may receive a user input for a particular application. For example, the information access determination unit 171 may receive a user input signal generated by the touch screen and may compare the received user input signal with a user input which has been preset and is stored in the storage unit 130.

In operation 310, the electronic apparatus 100 may determine whether the user input is a preset first access control mode input. The preset first access control mode input may be, for example, a combination of one or more of a touch and hold input, a drag input, an input from an electronic pen, and a particular gesture input, and is not limited to a particular input in various embodiments of the present disclosure. The preset first access control mode input may be preset by the user.

When the user input is the first access control mode input, the electronic apparatus 100 may branch to operation 315 and may limit the execution of at least some of remaining applications except for a first application. For example, the electronic apparatus 100 may deactivate the at least some of the remaining applications except for the first application. The information access control unit 175 may stop allocating program resources, window resources, and the like to the at least some of the remaining applications except for the first application. The information access control unit 175 may also control the display unit 120 to display a shade or color of deactivated applications differently from that of activated applications so as to enable the user to distinguish the deactivated applications from the other applications.

When the user input is not the first access control mode input, the electronic apparatus 100 may proceed to operation 320 and may determine whether the user input is a preset second access control mode input. The preset second access control mode input may be, for example, a combination of one or more of a touch and hold input, a drag input, an input from an electronic pen, and a particular gesture input, and is not limited to a particular input in various embodiments of the present disclosure. The preset second access control mode input may be preset by the user. The second access control mode input may be a variable input that the user may set.

When the user input is the second access control mode input, the electronic apparatus 100 may branch to operation 325 and may limit the provision of at least one piece of content among pieces of content related to the first application. A specific operation of limiting the provision of the at least one piece of content will be described in detail with reference to FIGS. 9 to 11E.

When the user input is not the second access control mode input, the electronic apparatus 100 may proceed to operation 330 and may perform a relevant function corresponding to the relevant input. For example, the electronic apparatus 100 may receive an input for operating a preset lock screen, an input for executing a preset music reproduction application, an input for outputting a preset home screen, and the like, and may perform a relevant function corresponding to the received input.

Figure 4A:
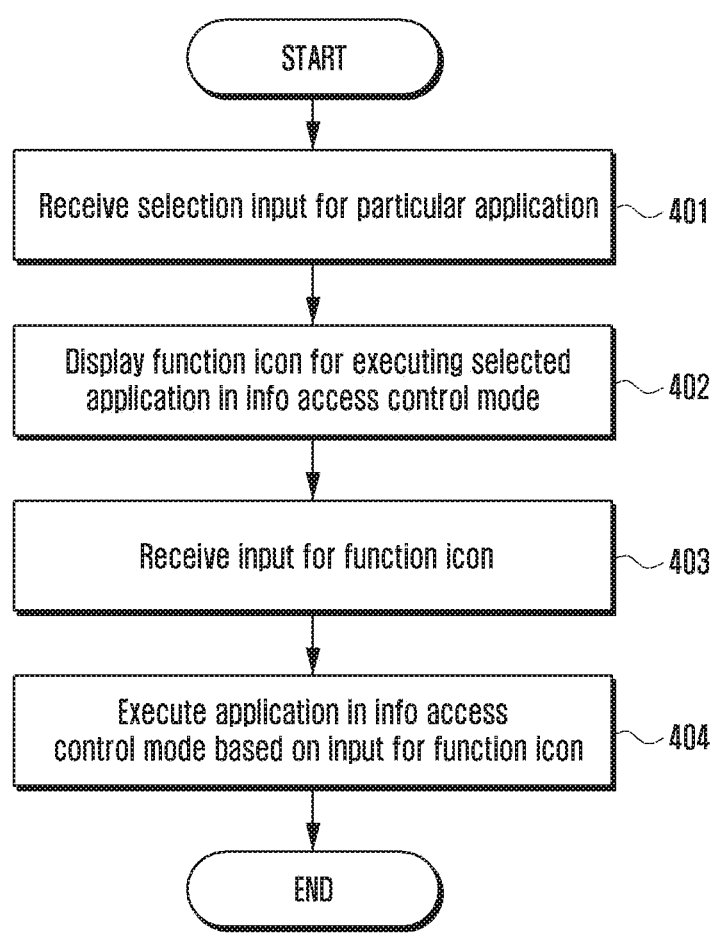
FIG. 4A is a flowchart illustrating an operation of an electronic apparatus for displaying a functional icon in order to execute an application in an information access control mode according to an embodiment of the present disclosure.

FIG. 4A is a flowchart illustrating an operation of an electronic apparatus for displaying a functional icon in order to execute an application in an information access control mode according to an embodiment of the present disclosure.

Referring to FIG. 4A, in operation 401, the electronic apparatus 100 may receive a selection input for a particular application. For example, the electronic apparatus 100 may display icons of multiple applications through the display unit 120 and may receive from the user, a selection input for a particular application from among the multiple applications. In the present example, the selection input may be various inputs such as a long press input and the like.

In operation 402, the electronic apparatus 100 may display a function icon for executing the selected application in an information access control mode. For example, the electronic apparatus 100 may display a UI menu including at least one function icon according to the long press input in operation 401. At least one of the function icons included in the UI menu may also be a function icon for executing the selected application in an information access control mode. In this case, one of the function icons may be a function icon for executing a first information access control mode and one of the remaining function icons may be a function icon for executing a second information access control mode. Further, the electronic apparatus 100 may display the function icon for executing the selected application in the information access control mode at a position adjacent to a point where an icon of the relevant application is displayed.

In operation 403, the electronic apparatus 100 may receive from the user, an input for a function icon. For example, the electronic apparatus 100 may receive from the user, a touch input for the function icon for executing an application in the information access control mode among the function icons displayed in operation 402.

In operation 404, the electronic apparatus 100 may execute the application in the information access control mode on the basis of the input for the function icon. For example, the electronic apparatus 100 may recognize the input for the function icon as an information access control mode input and may execute the relevant application in the information access control mode.

Figure 4B:
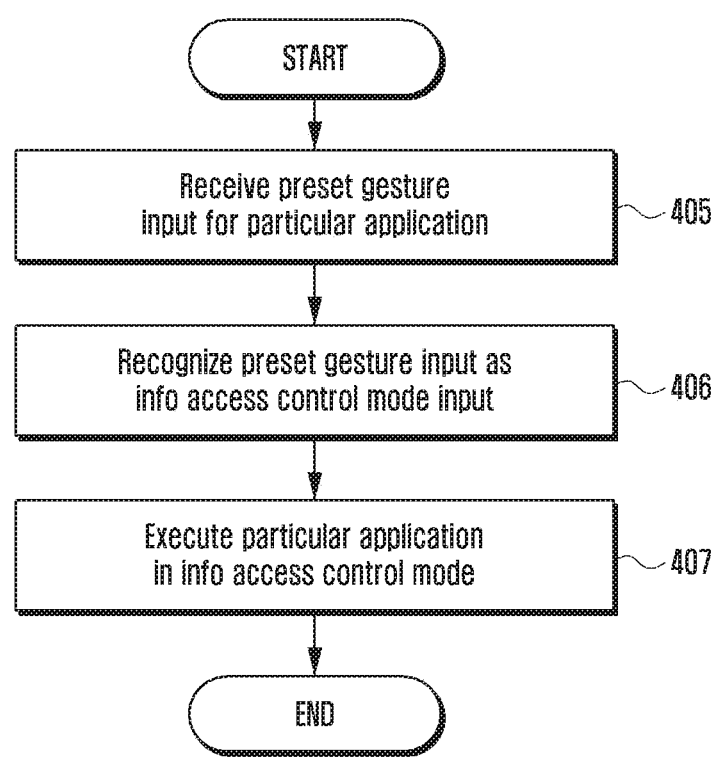
FIG. 4B is a flowchart illustrating an operation of an electronic apparatus for executing an application in an information access control mode through a preset gesture input according to an embodiment of the present disclosure.

FIG. 4B is a flowchart illustrating an operation of an electronic apparatus for executing an application in an information access control mode through a preset gesture input according to an embodiment of the present disclosure.

Referring to FIG. 4B, in operation 405, the electronic apparatus 100 may receive a preset gesture input for a particular application. Examples of the preset gesture input may include various interaction inputs such as a touch input, a hovering input, a drag input, a pinch-zoom input, an input from an electronic pen, and the like.

In operation 406, the electronic apparatus 100 may recognize the preset gesture input as an information access control mode input. In this case, the electronic apparatus 100 may determine whether the preset gesture input is a first access control mode input or a second access control mode input as in operation 310 and operation 320 illustrated in FIG. 3.

In operation 407, the electronic apparatus 100 may execute the particular application in the information access control mode. The electronic apparatus 100 may execute the particular application in a first access control mode or a second access control mode according to the type of the information access control mode input which has been determined in operation 406. The electronic apparatus 100 may also limit the execution of at least some of applications other than the particular application, before, after, or simultaneously with the execution of the particular application in the information access control mode.

Figure 5A:
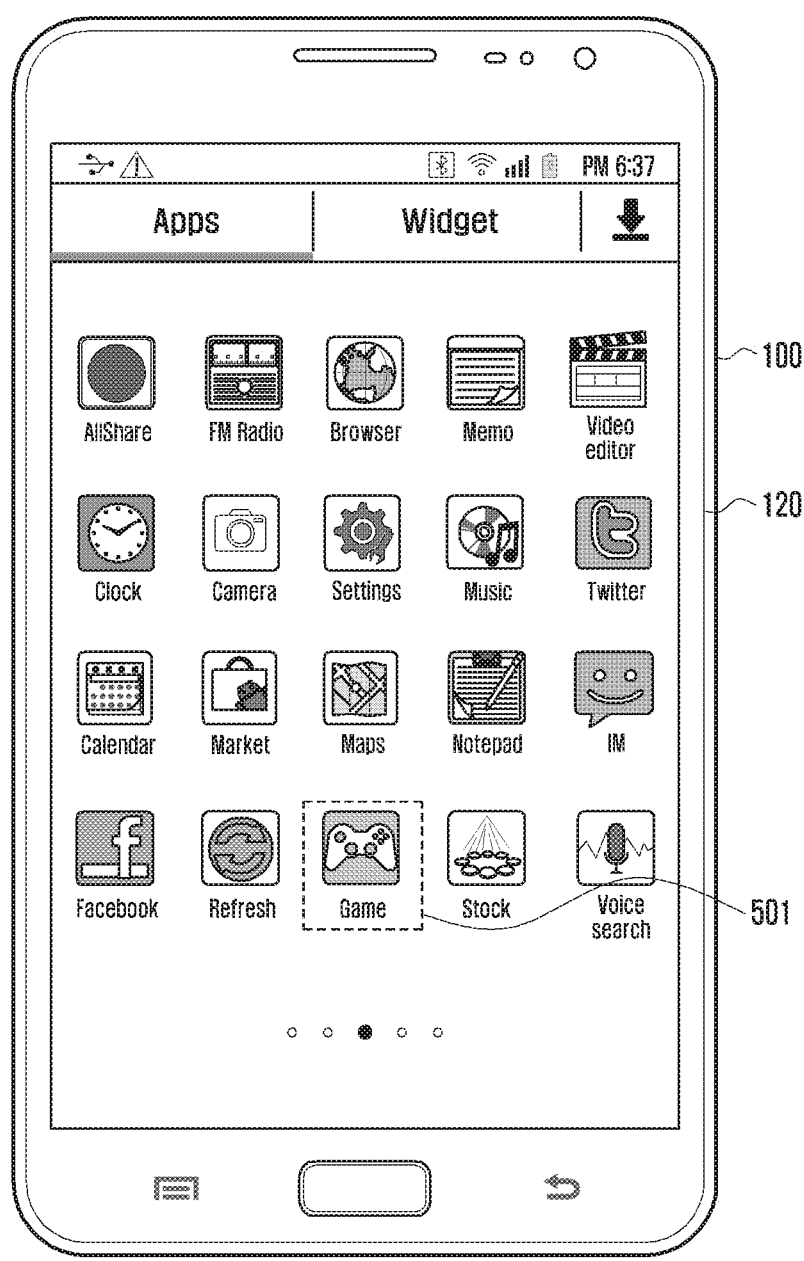
FIGS. 5A to 5C are views illustrating examples of operations illustrated in FIG. 4A according to an embodiment of the present disclosure.
Figure 5B:
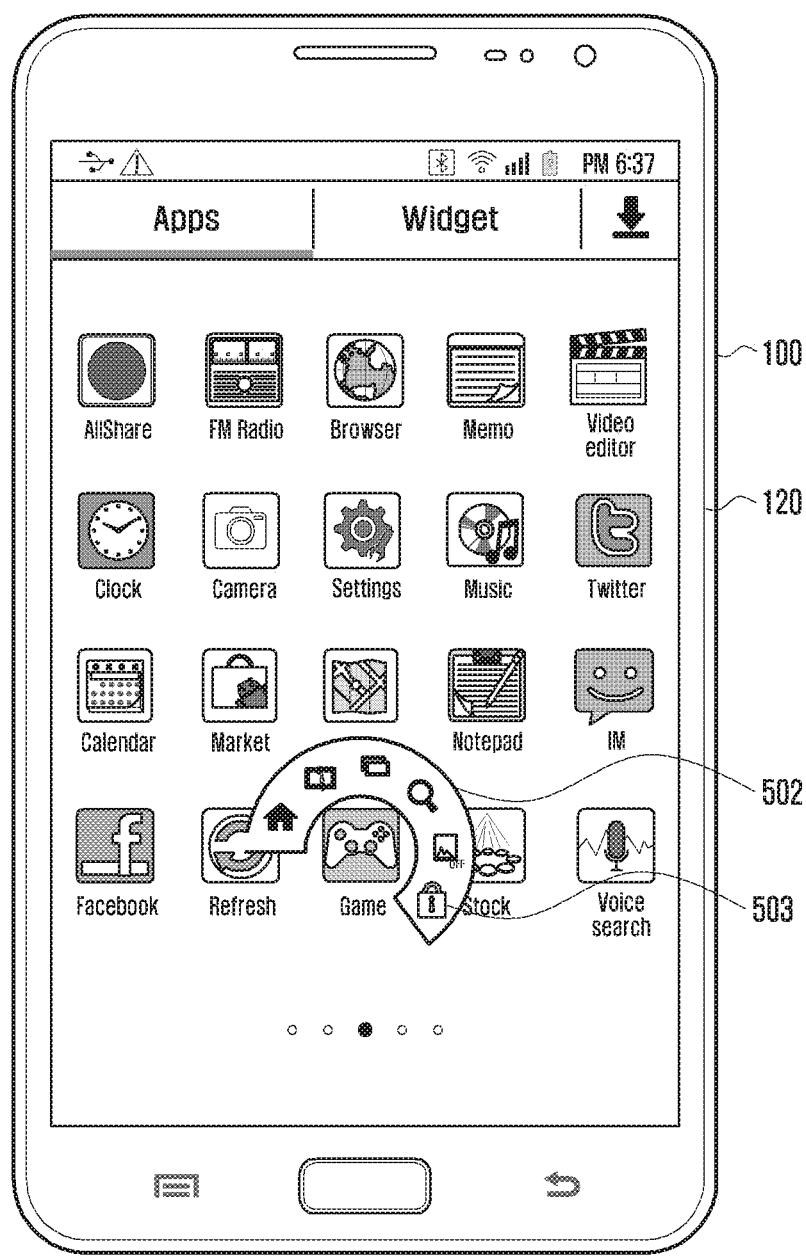
Figure 5C:
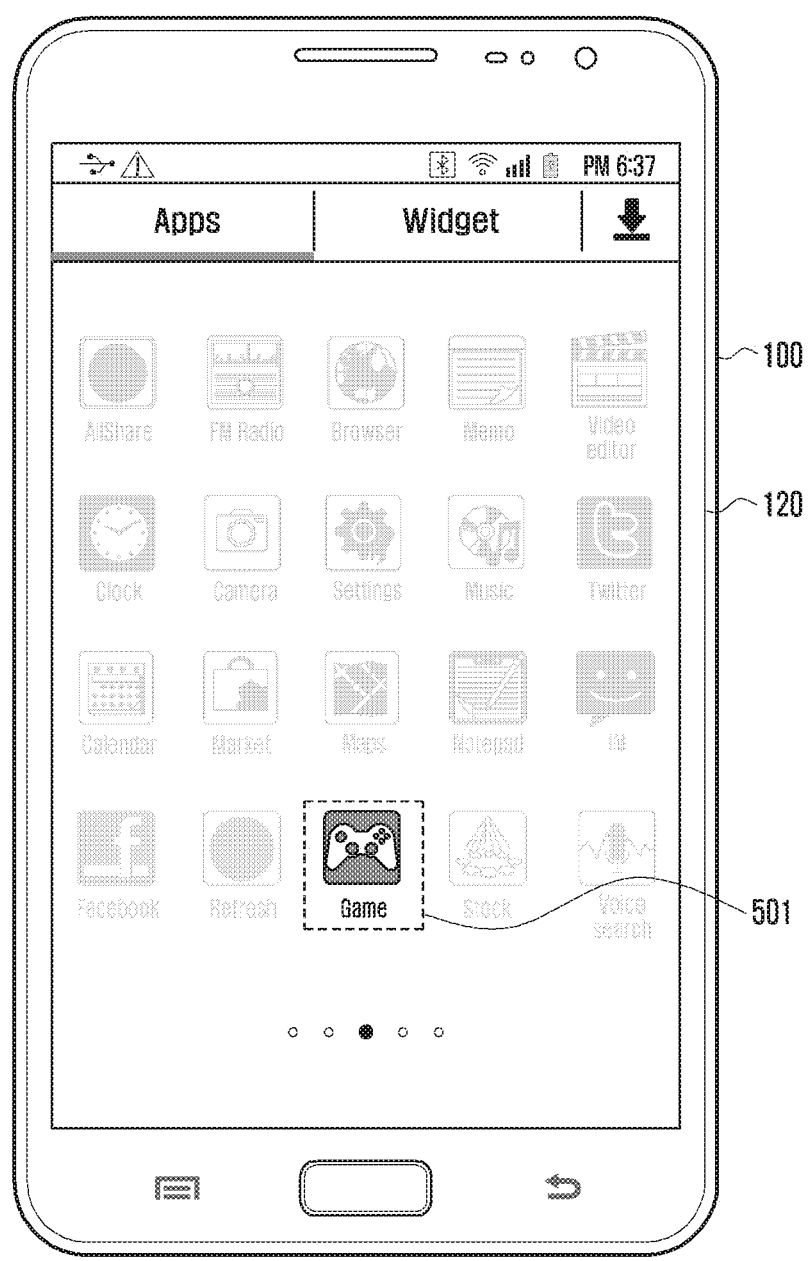

FIGS. 5A to 5C are views illustrating examples of operations illustrated in FIG. 4A according to an embodiment of the present disclosure.

Referring to FIG. 5A, the electronic apparatus 100 may display at least one application icon through the display unit 120. Each application icon includes a simple image representing the type, category, and the like, of the relevant application, and includes routine information capable of executing an application which is stored in the storage unit 130 according to the user's selection. In order to execute a particular application in an information access control mode, the electronic apparatus 100 may receive from the user, a selection input for an icon 501 of the particular application. For example, the electronic apparatus 100 may receive from the user, a long press input for the icon 501 of the particular application.

Referring to FIG. 5B, a view is shown that illustrates a display of a UI menu 502 according to the long press input for the icon 501 of the particular application illustrated in FIG. 5A. The UI menu may be a menu window for executing a function of a home screen or an application. The UI menu includes an icon 503 for executing the relevant application in the information access control mode. When the electronic apparatus 100 receives from the user, an input signal for the icon 503, the electronic apparatus 100 may execute the relevant application in the information access control mode.

Referring to FIG. 5C, a view is shown illustrating an example of an operation of limiting the execution of other applications when the application corresponding to the application icon 501 is executed in the first information access control mode according to an embodiment of the present disclosure. As illustrated in FIG. 5C, according to the execution of the application corresponding to the application icon 501 in the first information access control mode the other applications may be deactivated. Once the first information access control mode is set, when the electronic apparatus 100 receives from the user, the input signal for the icon 503, the electronic apparatus 100 may execute the application corresponding to the application icon 501 without performing the operation of deactivating the other applications as illustrated in FIG. 5C.

Figure 6:
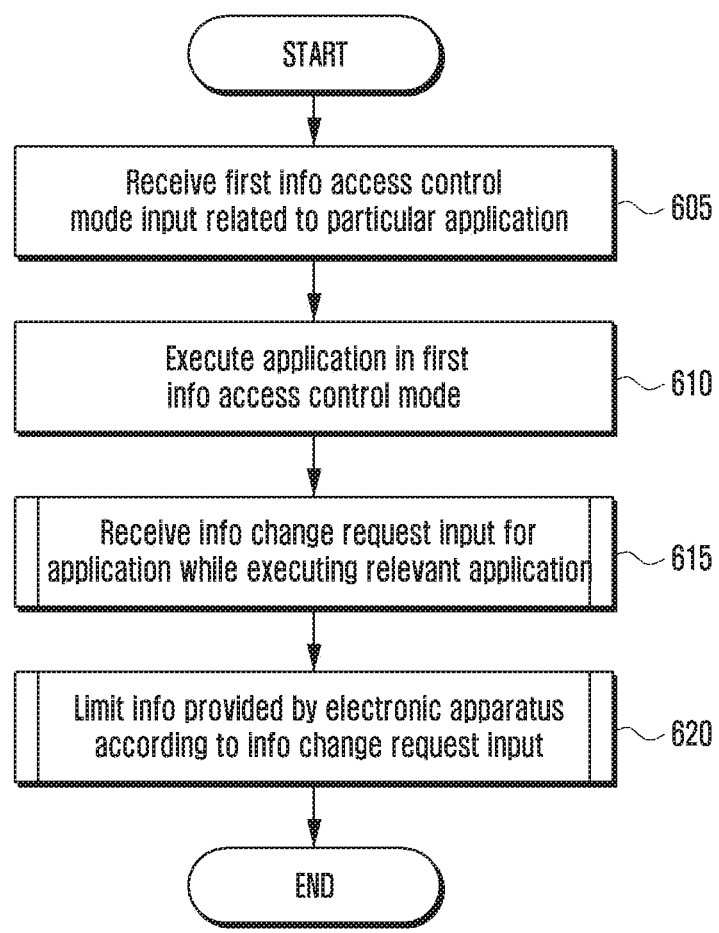
FIG. 6 is a flowchart illustrating an operation in which an electronic apparatus limits information provided thereby according to a first information access control mode according to an embodiment of the present disclosure.

FIG. 6 is a flowchart illustrating an operation in which an electronic apparatus limits information provided thereby according to a first information access control mode according to an embodiment of the present disclosure.

Referring to FIG. 6, in operation 605, the electronic apparatus 100 may receive from the user, a first information access control mode input related to a particular application. The first information access control mode input may be a combination of a long press input signal and an input for a UI item displayed according to a long press input. In addition, the first information access control mode input may be an input which is based on an electronic pen or a gesture.

The input unit 110 may receive a user input for the particular application and may generate a user input signal, and may deliver the generated user input signal to the information access determination unit 171. The information access determination unit 171 may compare the user input signal received from the input unit 110 with a signal stored in the storage unit 130, and thereby may determine whether the user input signal is an input signal for a first information access control mode.

In operation 610, the electronic apparatus 100 may execute the relevant application in the first information access control mode according to the first information access control mode input. For example, the information access determination unit 171 may generate an activation signal for activating the first information access control mode on the basis of a first information access control mode input signal, and may deliver the generated activation signal to the information access control unit 175. Accordingly, the information access control unit 175 may be activated and may control the respective elements of the electronic apparatus 100 to execute the application which is embedded in the electronic apparatus 100 in the first information access control mode.

In operation 615, the electronic apparatus 100 may receive an information change request input for the application while executing the relevant application in the first information access control mode. The information change request input for an application may be, for example, at least one of an input for terminating an application currently being executed, an input for switching the application currently being executed to another application, or an input for causing an application which is currently being executed in a foreground, to be executed in a background.

In operation 620, the electronic apparatus 100 may limit information provided thereby according to the information change request input for the application. For example, the electronic apparatus 100 may perform a lock function when a request is made for a user input for terminating an application or an input for switching an application currently being executed to another application. Accordingly, the electronic apparatus 100 may prevent an application other than the particular application which is allowed to be disclosed by the owner of the electronic apparatus 100, from being disclosed to another person.

Figure 7:
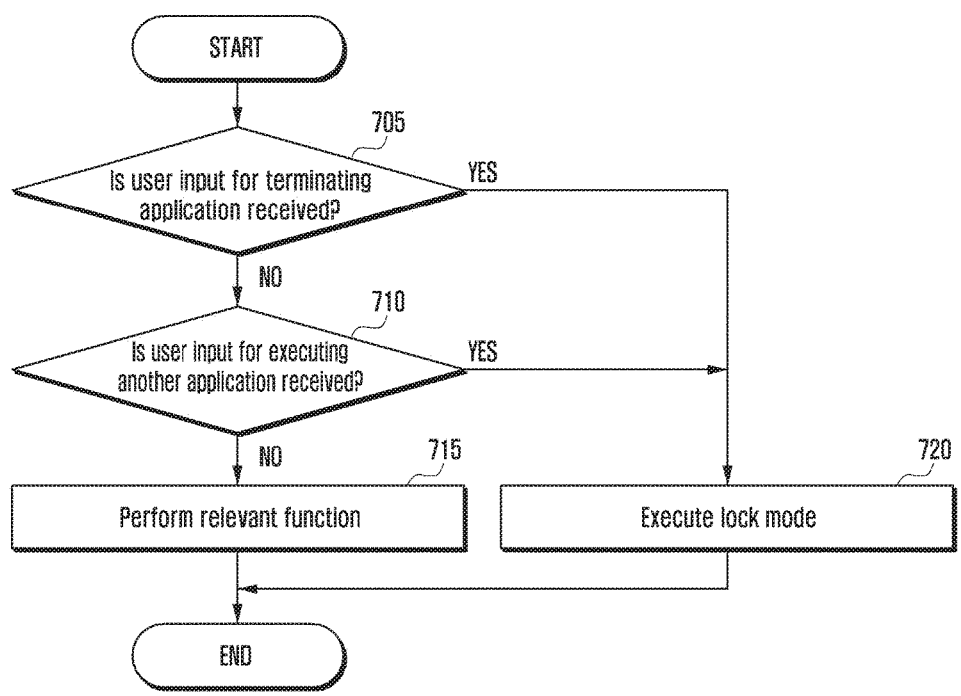
FIG. 7 is a flowchart illustrating detailed operations of FIG. 6 according to an embodiment of the present disclosure.

FIG. 7 is a flowchart illustrating detailed operations of FIG. 6 according to an embodiment of the present disclosure.

FIG. 7 illustrates operations 615 and 620 of FIG. 6 in greater detail. Referring to FIG. 7, in operation 705, the electronic apparatus 100 may determine whether a user input for terminating an application is received. For example, the information access control unit 175 may determine whether a user input (e.g., multiple inputs through a back button, an input through a home button, and the like) for terminating a first application which is currently being executed in a state of a first access control mode, is received.

When the user input for terminating the application has been received, the electronic apparatus 100 may branch to operation 720 and may operate the electronic apparatus 100 in the lock mode. For example, when the user input for terminating the application has been received, the information access control unit 175 may control the respective elements of the electronic apparatus 100 to operate the electronic apparatus 100 in the lock mode.

When the user input for terminating the application has not been received, the electronic apparatus 100 may proceed to operation 710 and may determine whether a user input for executing another application is received. For example, the information access control unit 175 may determine whether a user input (e.g., a click on a second application link, and so forth) for switching to a second application which is different from the first application currently being executed in the state of the first access control mode, is received.

When the user input for executing another application has been received, the electronic apparatus 100 may branch to operation 720 and may operate the electronic apparatus 100 in the lock mode. For example, when the user input for executing another application has been received, the information access control unit 175 may control the respective elements of the electronic apparatus 100 to operate the electronic apparatus 100 in the lock mode.

When the user input for executing another application has not been received, the electronic apparatus 100 may proceed to operation 715 and may perform a relevant function. For example, the electronic apparatus 100 may adjust a reproduction volume of music content and the like provided by the first application currently being executed, or may perform the environment setting of multimedia content, and the like.

Figure 8A:
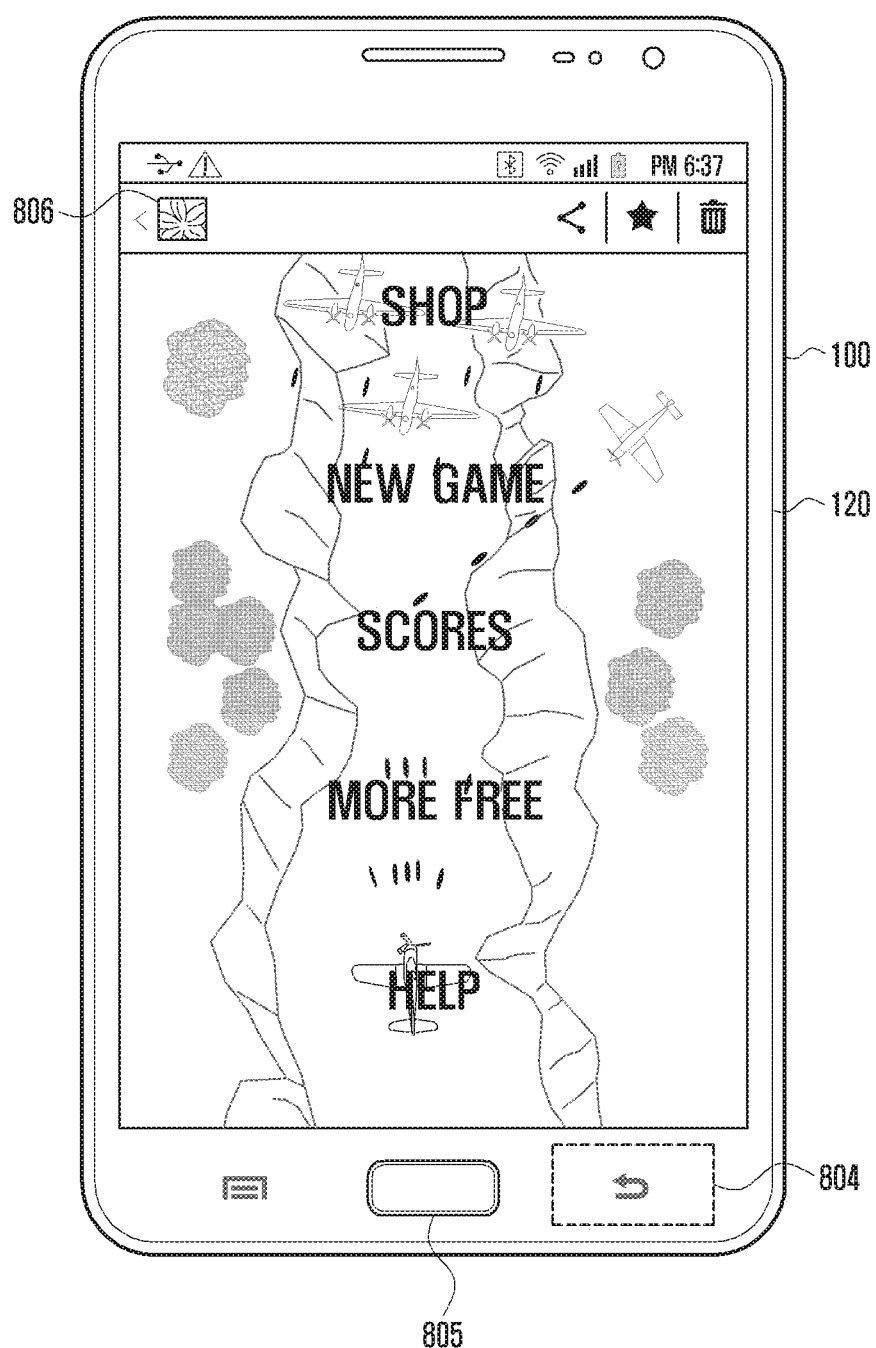
FIGS. 8A and 8B are views illustrating examples of operations illustrated in FIG. 6 according to an embodiment of the present disclosure.
Figure 8B:
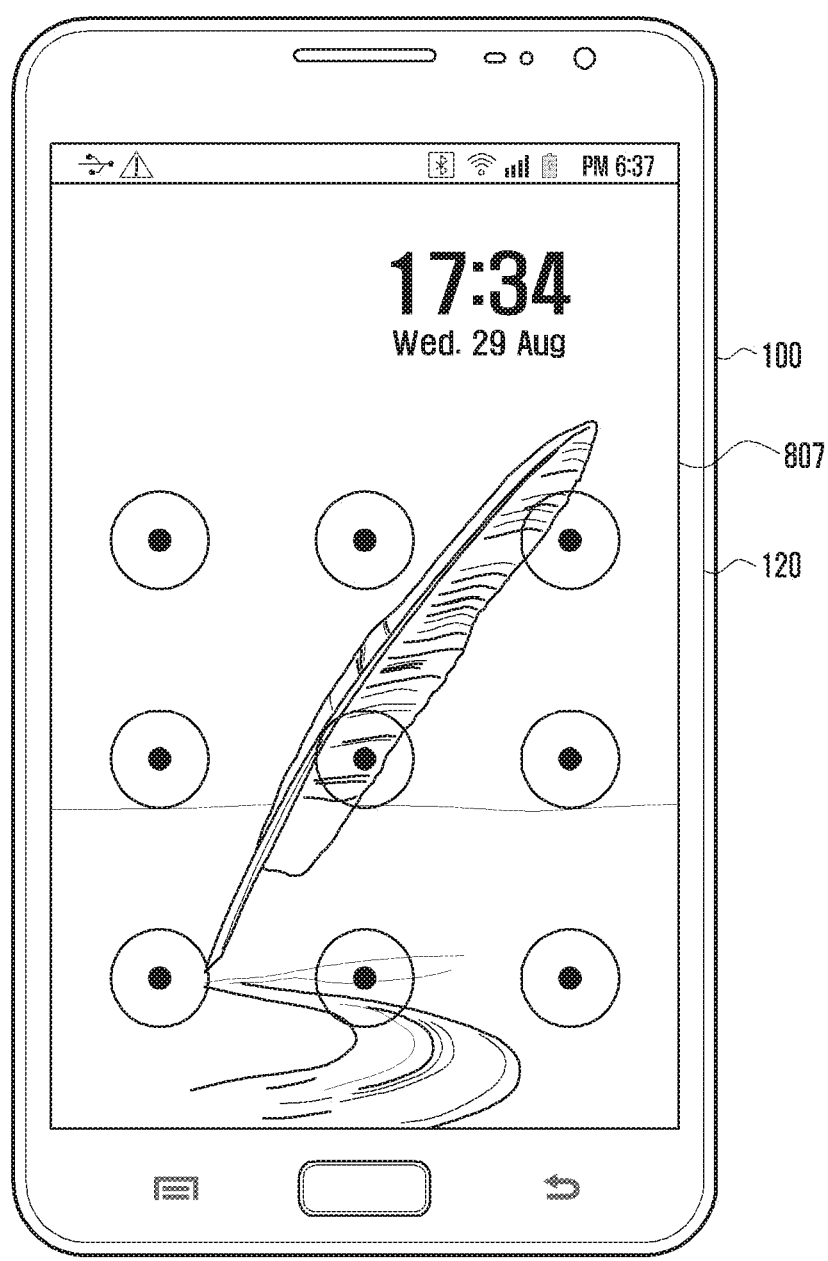

FIGS. 8A and 8B are views illustrating examples of operations illustrated in FIG. 6 according to an embodiment of the present disclosure.

Referring to FIG. 8A, a view is shown that illustrates an application being executed in a first information access control mode according to an embodiment of the present disclosure. For example, the electronic apparatus 100 may execute a game application in the first information access control mode.

Referring to FIG. 8A, the electronic apparatus 100 outputs a screen and a sound which correspond to the game application, through the display unit 120 and the audio processing unit 150. In addition, the display unit 120 displays a back button 804, a home button 805, and an icon 806 of another application.

While executing a function of the application, the electronic apparatus 100 may receive from the user, an input signal for terminating the application currently being executed. For example, the electronic apparatus 100 may recognize an input signal for the back button 804 or the home button 805 from the user, as an input signal for terminating an application. The back button 804 may not be physically displayed, but may be a touch recognition area of a user environment for displaying a screen corresponding to the previous process. The back button 804 may be located in an optional area of the touch screen. The home button 805 may include a function of executing the relevant application as a background process or a hidden process.

The electronic apparatus 100 may also receive an input signal for executing another application. For example, the electronic apparatus 100 may receive from the user, a selection input for the icon 806 of another application. The icon 806 of another application illustrated in FIG. 8A is an icon of a photograph album application. The icon 806 of another application may include link information which enables the execution of the photograph album application.

Referring to FIG. 8B, the electronic apparatus 100 may perform a lock function according to an input signal for terminating an application, or an input signal for executing another application. For example, the electronic apparatus 100 may perform the lock function according to the reception of an input signal for the back button 804, the home button 805, or the icon 806 of another application as illustrated in FIG. 8A. The input signal for executing another application may be generated by touching the icon 806 of another application. For example, the icon 806 of another application may include execution link information of another application (e.g., a second application). Also, when the input signal for the home button 805 is received, the electronic apparatus 100 may perform the lock function. The input signal for the home button 805 may be, for example, a signal for executing an application being executed as a background process. The electronic apparatus 100 may display a lock screen 807 through the display unit 120 according to the execution of the lock function. The lock screen 807 may include a particular pattern and the like, which enable a password to be received as an input.

Figure 9:
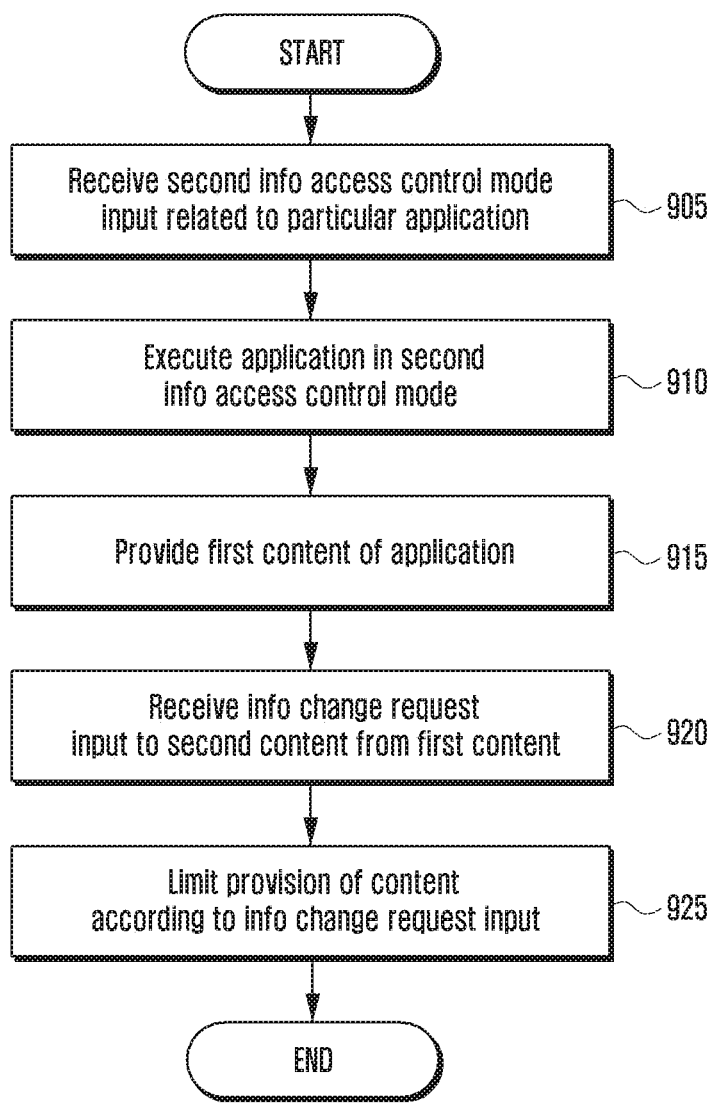
FIG. 9 is a flowchart illustrating an operation in which an electronic apparatus limits information provided thereby according to a second information access control mode according to an embodiment of the present disclosure.

FIG. 9 is a flowchart illustrating an operation in which an electronic apparatus limits information provided thereby according to a second information access control mode according to an embodiment of the present disclosure.

Referring to FIG. 9, in operation 905, the electronic apparatus 100 may receive a second information access control mode input related to a particular application. The second information access control mode input may be a combination of a long press input signal and an input for a UI item displayed according to a long press input. In addition, the second information access control mode input may be an input which is based on an electronic pen or a gesture. The second information access control mode input may be set according to a user input, and may be set differently from the case of a first information access control mode.

The input unit 110 may receive a user input for the particular application and may generate a user input signal, and may deliver the generated user input signal to the information access determination unit 171. The information access determination unit 171 may compare the user input signal received from the input unit 110 with a signal stored in the storage unit 130 and thereby may determine whether the user input signal is an input signal for a second information access control mode.

In operation 910, the electronic apparatus 100 may execute the application in the second information access control mode. For example, the information access control unit 175 may execute the relevant application in the second information access control mode according to the second information access control mode input. In this case, the information access determination unit 171 may generate an activation signal for activating the second information access control mode on the basis of a second information access control mode input signal, and may deliver the generated activation signal to the information access control unit 175. Accordingly, the information access control unit 175 may be activated, and may control the respective elements of the electronic apparatus 100 to execute the application embedded in the electronic apparatus 100 in the second information access control mode.

In operation 915, the electronic apparatus 100 may provide first content of the application. For example, the electronic apparatus 100 may output the first content provided by the particular application in a state of the second information access control mode. In this case, the control unit 170 may receive from the user, an execution command for executing the particular application, and may control the display unit 120 to display content generated by the execution of the relevant application. In the present example, the first content may be text, an image, or a moving image displayed by the execution of the application.

In operation 920, the electronic apparatus 100 may receive an information change request input to second content from the first content. For example, the electronic apparatus 100 may receive a swipe input from the left to the right or from the right to the left and the like, on the touch screen.

In operation 925, the electronic apparatus 100 may limit the provision of content according to the information change request input. For example, when the electronic apparatus 100 receives an information change request input for switching the first content currently being displayed to second content, the electronic apparatus 100 may continuously display the first content or may display the second content according to the type of the second content. A specific operation related to the above-describe configuration will be described in detail below with reference to FIG. 10.

Figure 10:
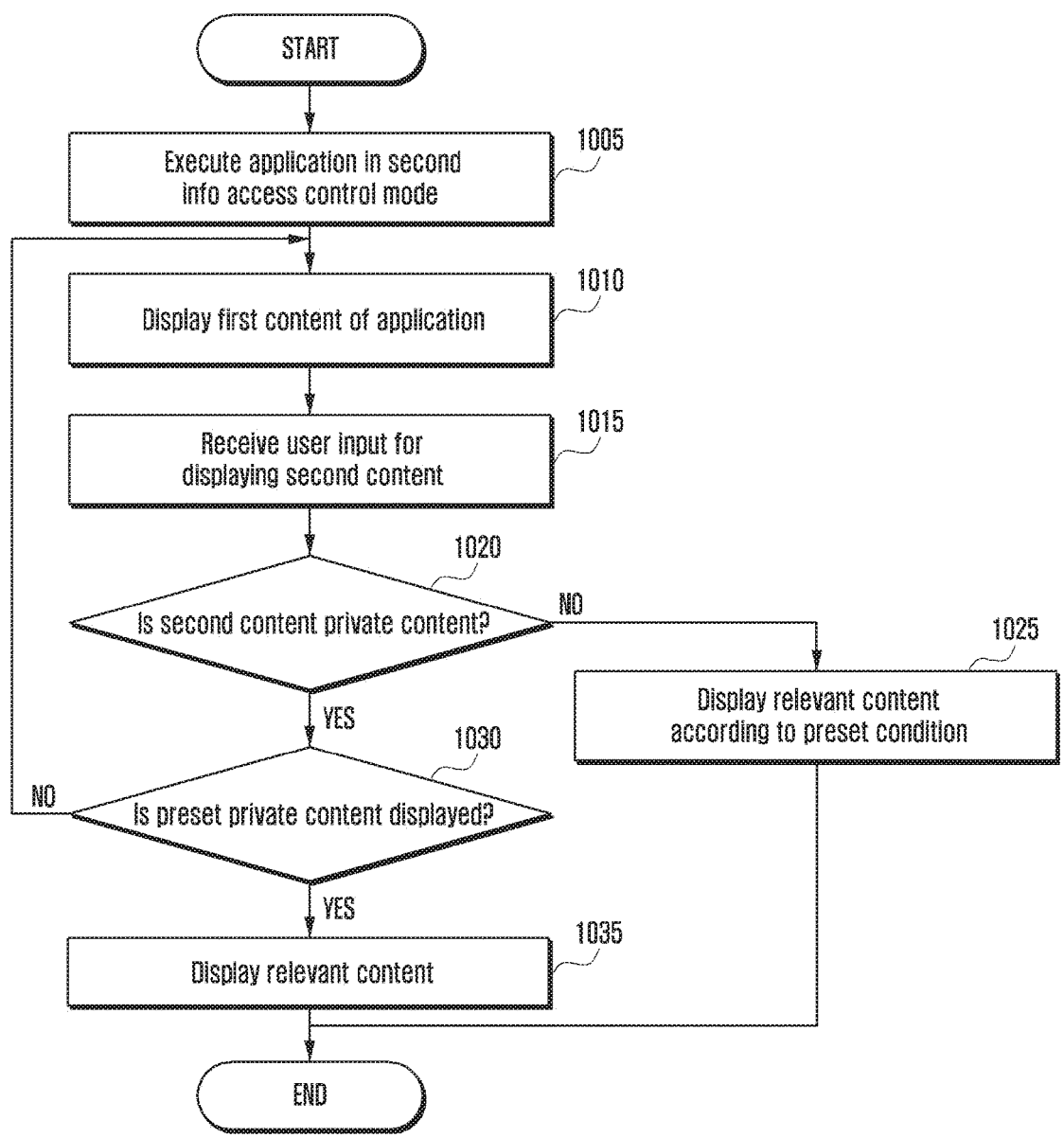
FIG. 10 is a flowchart illustrating an operation in which an electronic apparatus limits information provided thereby according to a second information access control mode according to an embodiment of the present disclosure.

FIG. 10 is a flowchart illustrating an operation in which an electronic apparatus limits information provided thereby according to a second information access control mode according to an embodiment of the present disclosure.

Referring to FIG. 10, the electronic apparatus 100 may execute an application in a second information access control mode in operation 1005, and may display first content of the application in operation 1010. A specific operation in which the electronic apparatus 100 executes the application in the second information access control mode, and the operation in which the electronic apparatus 100 displays the first content may be performed as in operations 910 and 915 illustrated in FIG. 9, respectively.

In operation 1015, the electronic apparatus 100 may receive a user input for displaying second content. For example, the electronic apparatus 100 may receive a swipe input from the left to the right or from the right to the left and the like, on the touch screen. However, various embodiments of the present disclosure are not limited thereto, and the electronic apparatus 100 may receive a combination of a particular gesture input and an input from an input means such as a touch pen and the like, as a user input for displaying the second content.

In operation 1020, the electronic apparatus 100 may determine whether the second content is private content. For example, the control unit 170 may access information on the second content from the storage unit 130 on the basis of the user input for displaying the second content, and may determine whether the second content is private content by analyzing the accessed information on the second content. The control unit 170 may determine whether an identifier which enables the second content to be recognized as private content, is added to the accessed information on the second content and thereby may identify that the second content is private content.

When the second content is not private content, the electronic apparatus 100 may branch to operation 1025 and may display the relevant content according to a preset condition. The preset condition may include at least one of whether the second content is public content, whether the second content is normal content, or whether the second content is to be displayed.

For example, the electronic apparatus 100 may determine that the second content is public content. In this case, the control unit 170 may access information on the second content from the storage unit 130 on the basis of the user input for displaying the second content, and may determine whether the second content is public content by analyzing the accessed information on the second content. The control unit 170 may determine whether an identifier which enables the second content to be recognized as public content, is added to the accessed information on the second content and thereby may identify that the second content is public content. When the second content is public content, the electronic apparatus 100 may display the relevant content, namely, the public content. That is, when the second content is public content, the electronic apparatus 100 may display the relevant public content without particular limitation.

When the second content is not public content, the electronic apparatus 100 may determine whether the second content is to be displayed. For example, when the second content is neither private content nor public content, the second content is normal content for which the user does not indicate by setting, whether the second content is to be disclosed and thus the electronic apparatus 100 may directly receive from the user, an input as to whether the relevant content is to be displayed. In this case, since the current user of the electronic apparatus 100 may be another person who is not the owner of the electronic apparatus 100, the electronic apparatus 100 may display a lock screen and may receive the input as to whether the relevant content is to be displayed, together with an input for releasing the lock screen. When the electronic apparatus 100 receives an input for displaying the second content, the electronic apparatus 100 may display the relevant content, namely, the second content through the display unit 120. When the input for displaying the second content is not received, the electronic apparatus 100 may return to operation 1010 and may continuously display the first content. In this case, the electronic apparatus 100 may display a message window which states that the second content may not be displayed and may re-display the first content or may display a control window capable of terminating the relevant application according to the user's selection.

When the second content is private content, the electronic apparatus 100 may proceed to operation 1030 and may determine whether preset public content is to be displayed instead. The preset public content may first be selected by the control unit 170. For example, the control unit 170 may select the preset public content on the basis of sequential order that the user has preset, or sequential order in which identifiers enabling the recognition of public content are added. Specifically, the preset public content may be content to which an identifier enabling the recognition of public content is added first or last. The preset public content may also be selected on the basis of a preset condition in relation to the second content. For example, according to the preset condition, the preset public content may be public content which has a time point closest to a time point of generating the second content among pieces of public content and which has information coinciding with tag information, metadata, link information and the like of the second content. According to an embodiment of the present disclosure, when the preset public content does not exist, the control unit 170 may display a lock screen as the control unit 170 operates the electronic apparatus 100 in the lock mode. Accordingly, the control unit 170 may limit information provided by the electronic apparatus 100.

According to an embodiment of the present disclosure, the electronic apparatus 100 may control the display unit 120 to display a control window in order to receive from the user, a selection input for selecting whether the preset public content is to be displayed.

When the user inputs a display request for the preset public content, the electronic apparatus 100 may proceed to operation 1035 and may display the relevant content, namely, the preset public content. When a display request input for the preset public content is not received from the user, the electronic apparatus 100 may return to operation 1010 and may continuously display the first content. The electronic apparatus 100 may also display a message window which represents that the preset public content may not be displayed and may re-display the first content or may display a control window capable of terminating the relevant application according to the user's selection.

FIGS. 11A to 11E are views illustrating examples of operations illustrated in FIG. 10 according to an embodiment of the present disclosure.

Figure 11A:
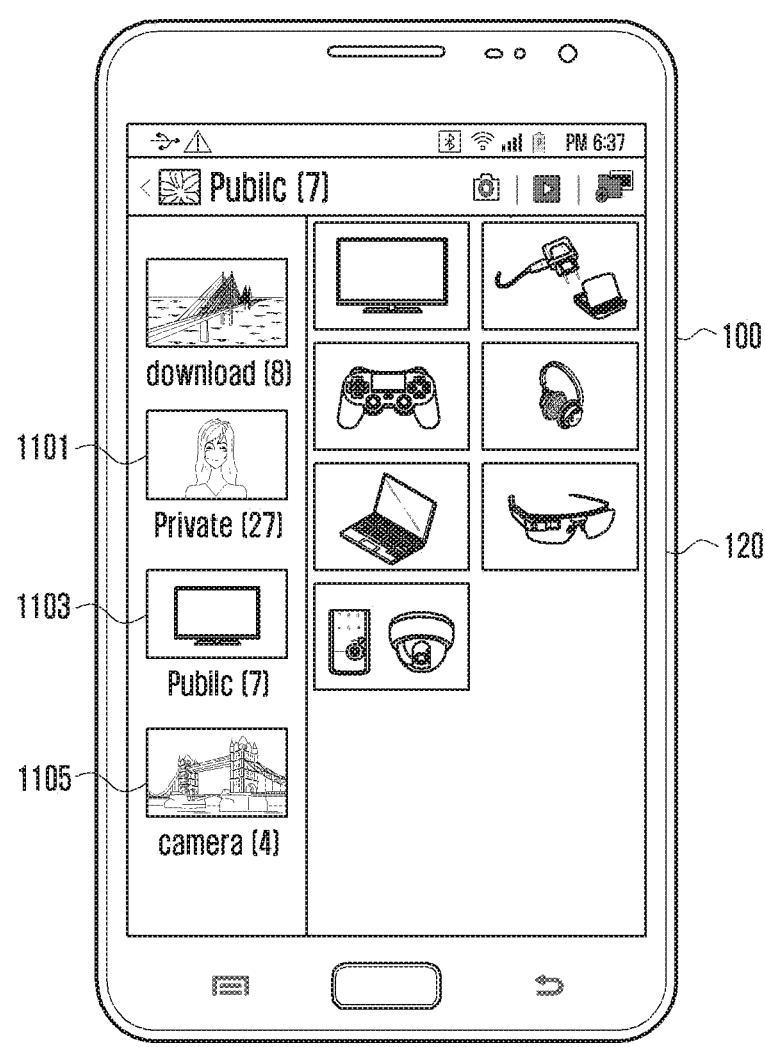
FIGS. 11A to 11E are views illustrating examples of operations illustrated in FIG. 10 according to an embodiment of the present disclosure.
Figure 11B:
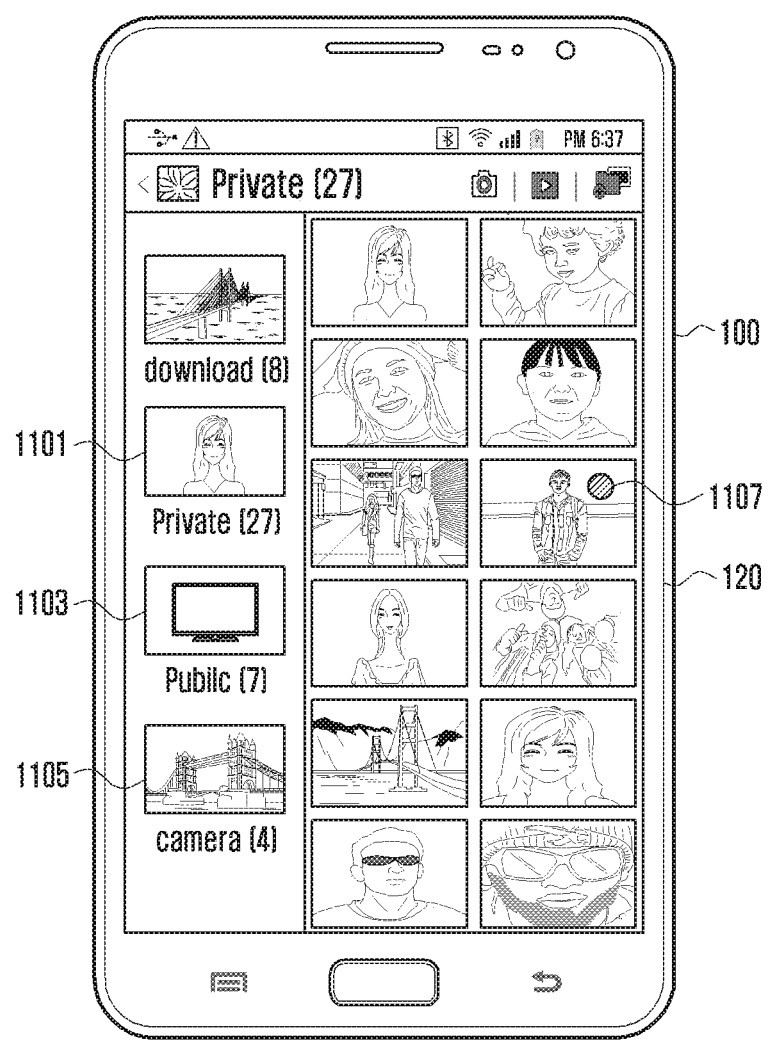

For example, FIGS. 11A and 11B illustrate the display of a content list including multiple pieces of content in a photograph album application.

Referring to FIGS. 11A and 11B, list elements which include respective content groups into which the multiple pieces of content are classified according to their types, are displayed at the left part of the display unit 120. The list is illustrated as including a download list element, a private list element 1101, a public list element 1103, and a camera list element 1105. At a lower end part of each list element, the type of each list element and the number of pieces of content are displayed. At the right part of the display unit 120, a content list of the pieces of content corresponding to each list element is displayed in the form of a thumbnail image. FIG. 11A illustrates the display of a content list of the public list element 1103, and FIG. 11B illustrates the display of a content list of the private list element 1101.

Referring to FIG. 11B, the electronic apparatus 100 may receive from the user, a selection input for first content 1107. In the present example, the first content 1107 is any one piece of content of the content list of the private list element 1101. The electronic apparatus 100 displays first content 1111 which is obtained by magnifying the first content 1107 according to the selection input for the first content 1107 as illustrated in FIG. 11C.

Figure 11C:
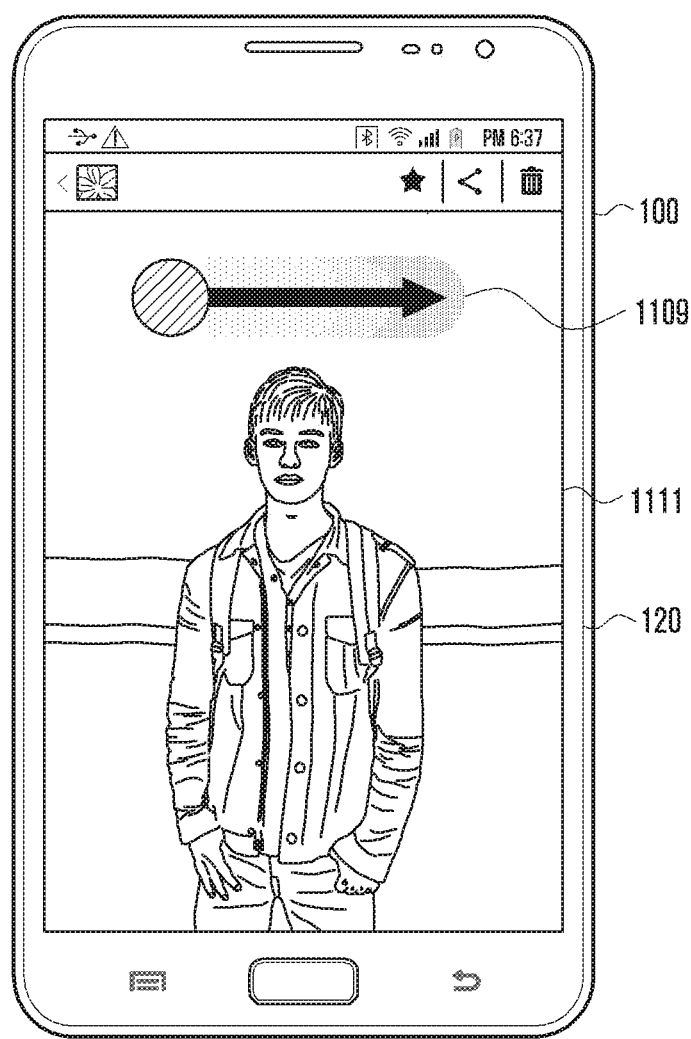

Referring to FIG. 11C, the electronic apparatus 100 may receive from the user, an information change request input for the first content 1111. For example, the control unit 170 may receive from the user, a swipe input 1109 from the left to the right as an input for displaying second content. The control unit 170 may temporarily access from the storage unit 130, the second content corresponding to the swipe input 1109. The control unit 170 may check whether the accessed second content has an identifier and thereby may determine whether the second content is private content, public content, or normal content. When the second content is public content, the electronic apparatus 100 may immediately display the second content. When the second content is normal content, the electronic apparatus 100 may display a screen which inquires about whether the second content is to be displayed. Hereinafter, a case is considered in which the second content is private content.

Figure 11D:
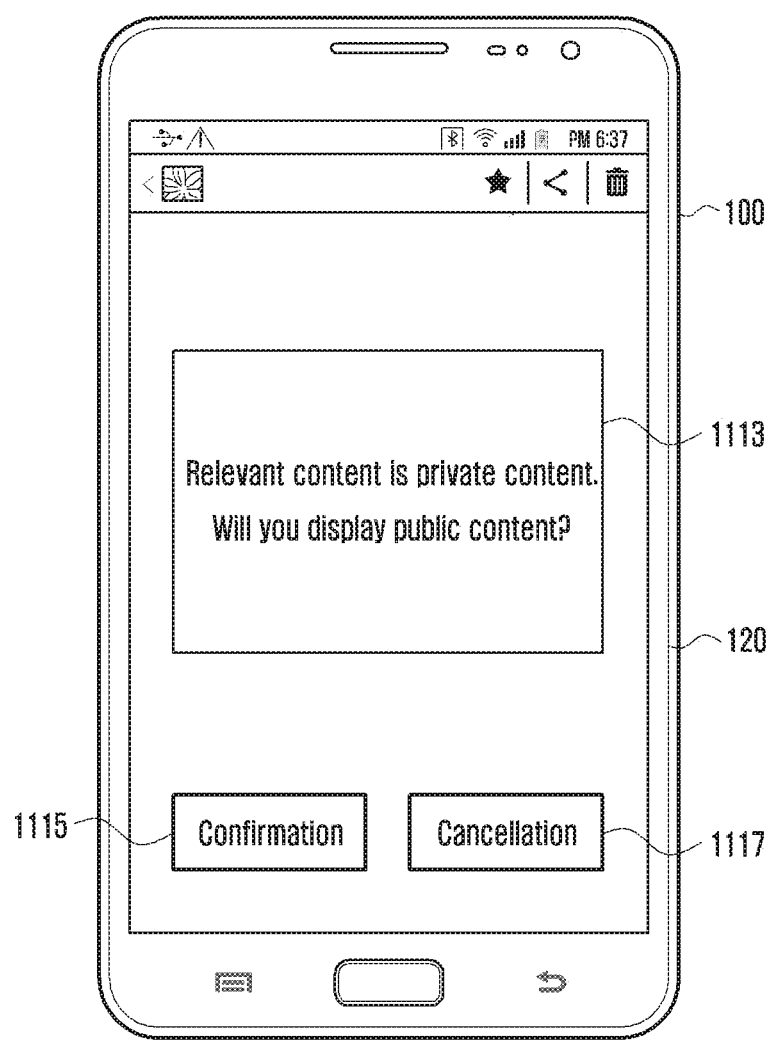
Figure 11E:
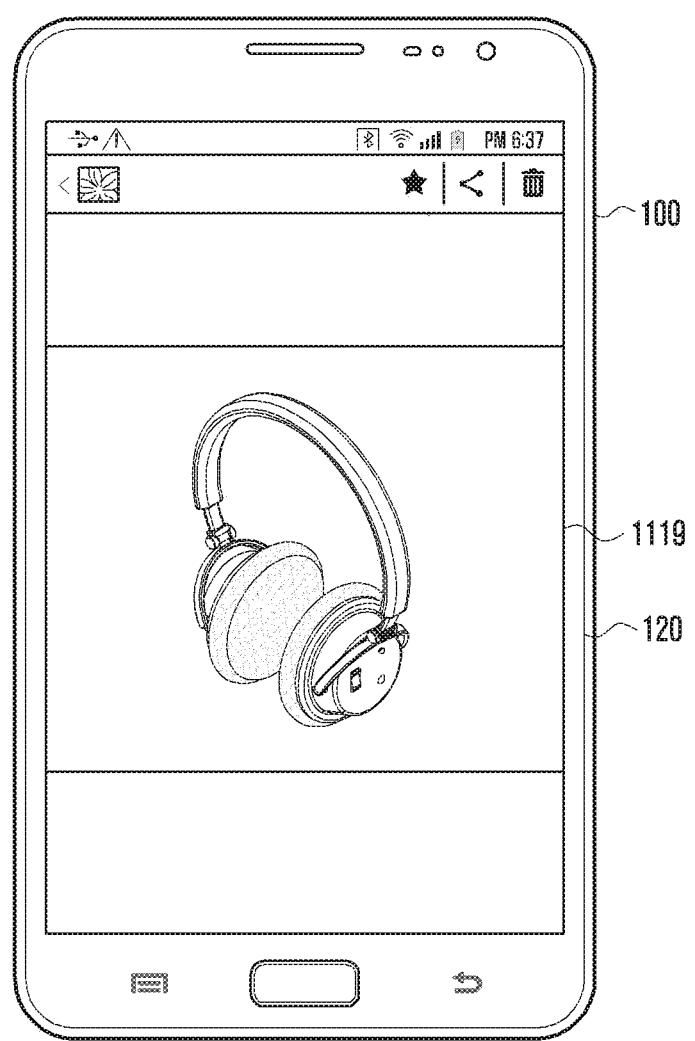

Referring to FIG. 11D, the electronic apparatus 100 notifies the user through a notification window 1113, that content corresponding to the swipe input is private content. The electronic apparatus 100 then notifies of whether different public content is to be displayed instead. The different public content is preset public content. When the user presses a confirmation icon 1115, the electronic apparatus 100 displays preset public content 1119 as illustrated in FIG. 11E. When the user presses a cancellation icon 1117, the electronic apparatus 100 may re-display the first content 1111 illustrated in FIG. 11C.

According to an embodiment of the present disclosure, the operation illustrated in FIG. 11D may be omitted by the user's setting. For example, when the second content is private content, the electronic apparatus 100 may not inquire of the user about whether different public content is to be displayed as illustrated in FIG. 11D, but may immediately display the preset public content 1119.

Figure 12:
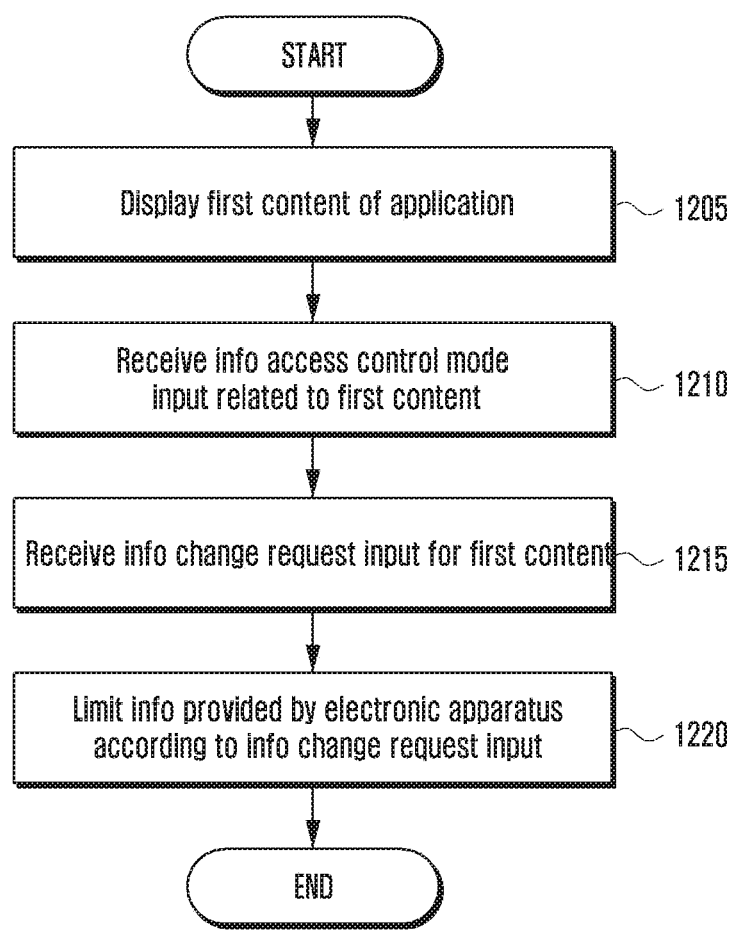
FIG. 12 is a flowchart illustrating an operation of an electronic apparatus for operating an information access control mode while executing an application according to an embodiment of the present disclosure.

FIG. 12 is a flowchart illustrating an operation of an electronic apparatus for operating an information access control mode while executing an application according to an embodiment of the present disclosure.

The information access control mode in FIG. 12 may be set during the execution of an application differently from the case of FIG. 6 and FIG. 9. Also, the information access control mode in FIG. 12 may be a second information access control mode.

Referring to FIG. 12, in operation 1205, the electronic apparatus 100 may display first content of an application. For example, the control unit 170 may receive from the user, an execution command for executing a particular application and may control the display unit 120 to display content generated by executing the relevant application. In the present example, the first content may be text, an image, or a moving image displayed by the execution of the application.

In operation 1210, the electronic apparatus 100 may receive a second information access control mode input related to the first content. For example, the information access determination unit 171 may determine whether an information access control mode input related to the first content is received from the user. The second information access control mode input is an input capable of controlling the display of pieces of content of the current application, and may be implemented by a long press input and the like. A second information access control mode allows the execution of an application, and thus the second information access control mode input may be performed even during the execution of an application.

When the information access control mode input related to the first content is received, the information access control unit 175 may be activated and may operate pieces of content of the relevant application in the information access control mode. In this case, the display unit 120 may display a particular UI item and the like, which indicate whether pieces of content provided by the current application are in a state of an information providing mode.

In operation 1215, the electronic apparatus 100 may receive an information change request input for the first content. The information change request input may be a user input for displaying the first content currently being displayed and second content other than the first content. For example, the information change request input may be a swipe input from the left to the right or from the right to the left on the display unit 120.

In operation 1220, the electronic apparatus 100 may limit information provided thereby according to the information access control mode input and the information change request input. For example, when the electronic apparatus 100 receives an information change request input for switching the first content currently being displayed to the second content, the electronic apparatus 100 may continuously display the first content or may display the second content according to the type of the second content. Subsequent operations may be performed similarly to operations 1020 to 1035 illustrated in FIG. 10.

Figure 13A:
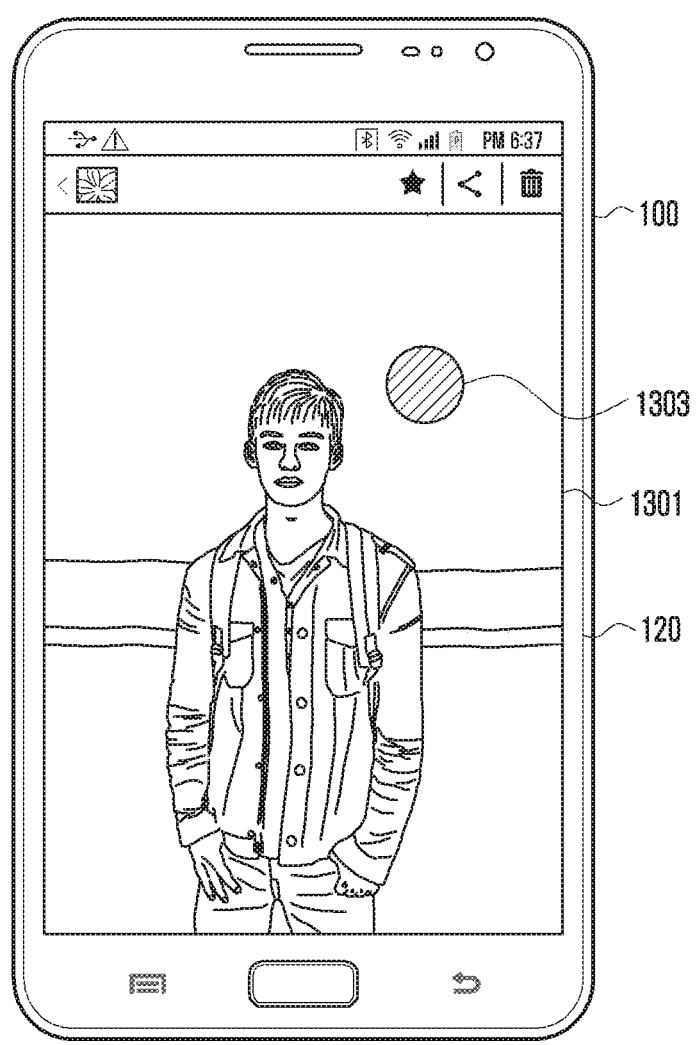
FIGS. 13A and 13B are views illustrating examples of operations illustrated in FIG. 12 according to an embodiment of the present disclosure.
Figure 13B:
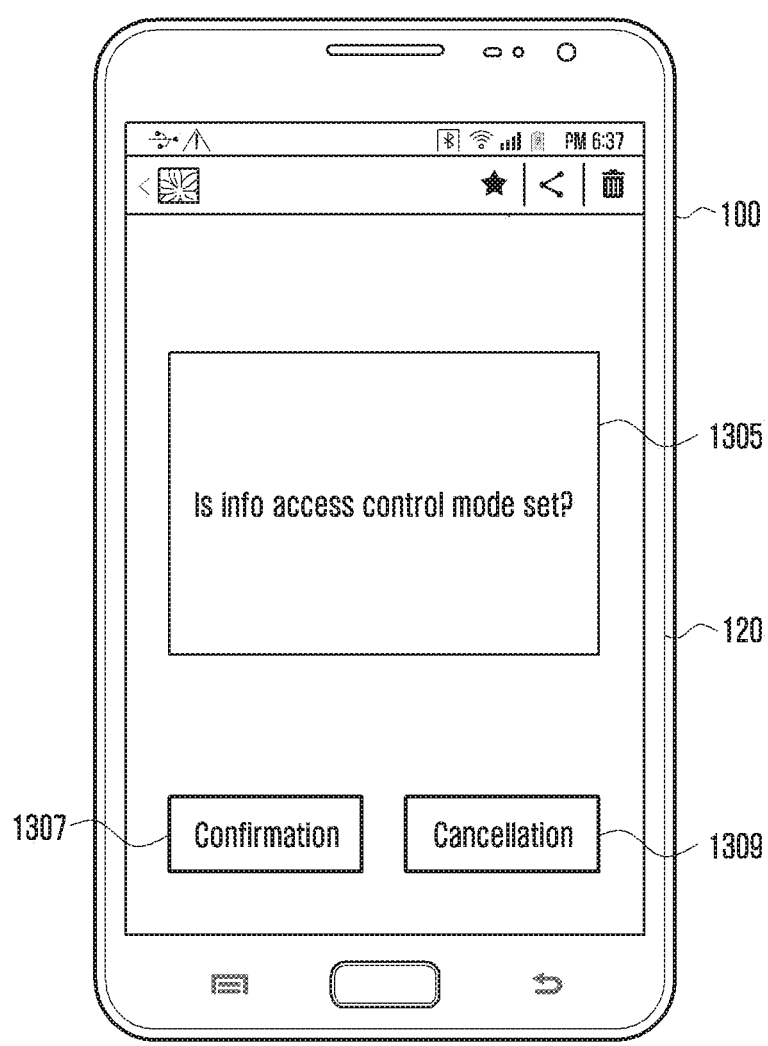

FIGS. 13A and 13B are views illustrating examples of operations illustrated in FIG. 12 according to an embodiment of the present disclosure.

Referring to FIG. 13A, a view is shown that illustrates a screen that displays first content 1301 included in a photograph album application. The first content may be one piece of content among private content, public content, and normal content. Since a current time point is before an information access control mode is set, the electronic apparatus 100 provides the user with the first content 1301 without particular limitation. The electronic apparatus 100 receives from the user, a touch and hold input 1303 as an information access control mode input related to the first content 1301 while displaying the first content 1301. In this case, the touch and hold input 1303 is an input for executing a second information access control mode and may be a preset user input. When the touch and hold input 1303 is received, the electronic apparatus 100 displays an information access control mode setting window 1305 as illustrated in FIG. 13B.

Referring to FIG. 13B, the information access control mode setting window 1305 is a UI screen that displays an inquiry as to whether an information access control mode is set for pieces of content of the application currently being executed. In addition, the electronic apparatus 100 displays a confirmation icon 1307 and a cancellation icon 1309 below the information access control mode setting window 1305. When the user selects the confirmation icon 1307, the electronic apparatus 100 provides the pieces of content of the application in the second information access control mode. When the user selects the cancellation icon 1309, the electronic apparatus 100 returns to the screen that displays the first content 1301 illustrated in FIG. 13A.

Figure 14:
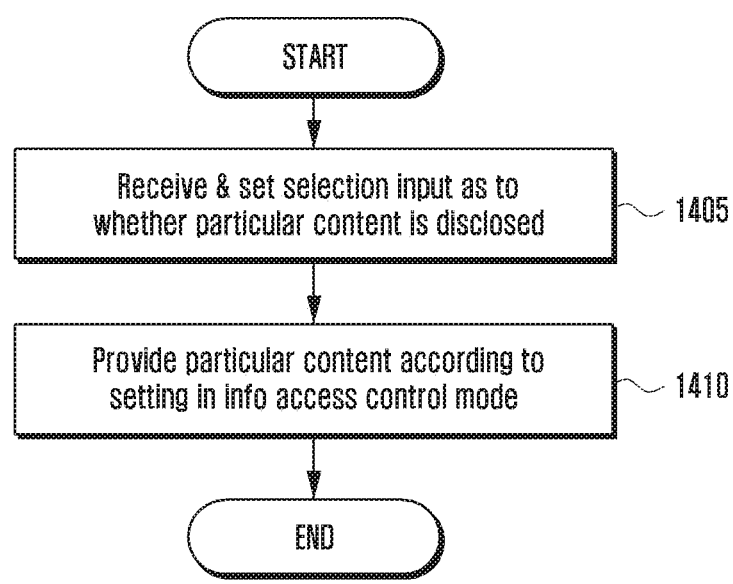
FIG. 14 is a flowchart illustrating an operation of an electronic apparatus for operating an information access control mode in a contact application according to an embodiment of the present disclosure.

FIG. 14 is a flowchart illustrating an operation of an electronic apparatus for operating an information access control mode in a contact application according to an embodiment of the present disclosure.

Referring to FIG. 14, in operation 1405, the electronic apparatus 100 may receive and set a selection input as to whether particular content is disclosed. For example, the information access control unit 175 may receive a selection input as to whether contact information of a particular person is disclosed, from the user through a window for the relevant contact information according to the execution of the contact application. The information access control unit 175 may store the received selection input in the storage unit 130.

In operation 1410, the electronic apparatus 100 may provide the particular content according to the setting in the information access control mode. When the information access control mode is executed, the electronic apparatus 100 may disclose the particular contact according to a value to which the relevant particular contact is set. When the particular contact is private content, the electronic apparatus 100 may not disclose the relevant particular contact. In contrast, when the particular contact is public content, the electronic apparatus 100 may disclose the relevant particular contact to another person.

Figure 15A:
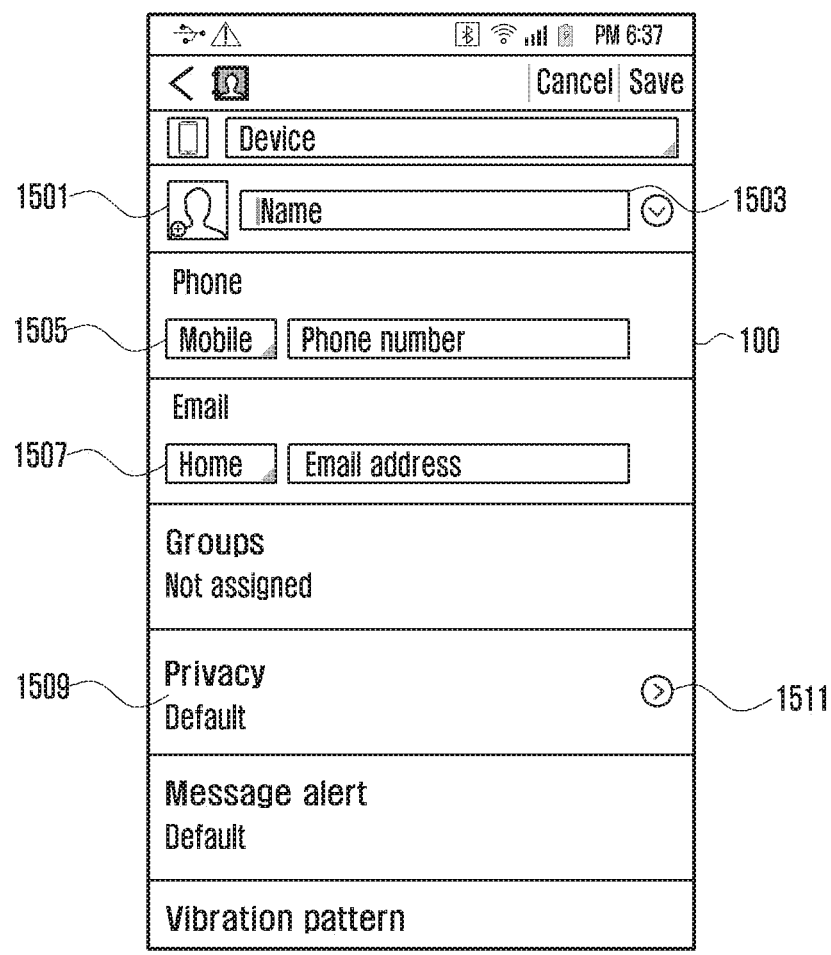
FIGS. 15A and 15B are views illustrating examples of operations illustrated in FIG. 14 according to an embodiment of the present disclosure.
Figure 15B:
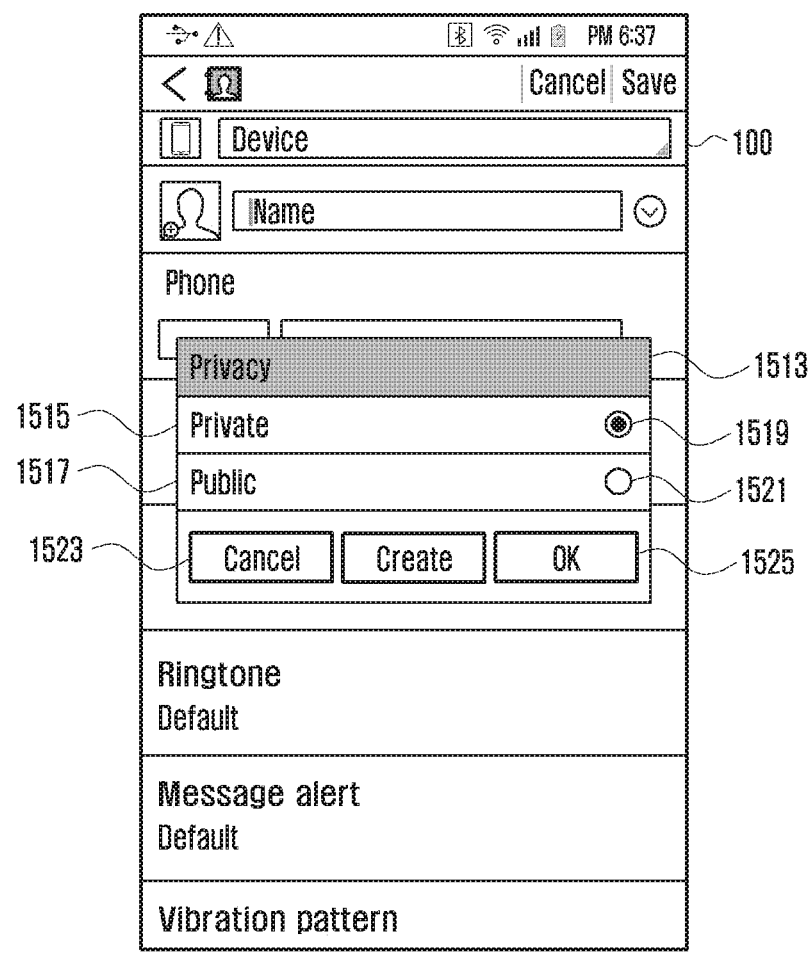

FIGS. 15A and 15B are views illustrating examples of operations illustrated in FIG. 14 according to an embodiment of the present disclosure.

FIG. 15A illustrates a state of the execution of a contact application.

Referring to FIG. 15A, according to the execution of the contact application, the electronic apparatus 100 may display a photograph icon 1501, a name entry area 1503, a mobile phone number entry area 1505, an email entry area 1507, and a setting area 1509 for setting whether a relevant contact is disclosed. The user may enter information and the like, of a person that the user intends to register in the mobile phone, through a window illustrated in FIG. 15A, and simultaneously or sequentially, may set whether the relevant contact is disclosed in the setting area 1509. The electronic apparatus 100 may receive a touch input for a setting icon 1511 as to whether the relevant contact is to be disclosed and thereby may display a window for specific setting information of the relevant contact.

FIG. 15B illustrates a screen on which the electronic apparatus 100 displays a setting window 1513 for setting whether the relevant contact is disclosed when, in FIG. 15A, the user touches the setting icon 1511 as to whether the relevant contact is to be disclosed.

Referring to FIG. 15B, in the setting window 1513, the electronic apparatus 100 may display a private area 1515, a public area 1517, a private check icon 1519, a public check icon 1521, a cancellation icon 1523, a confirmation icon 1525, and the like.

When the user selects the private check icon 1519 for the relevant contact and selects the confirmation icon 1525, the electronic apparatus 100 may not provide the relevant contact in the information access control mode. In contrast, when the user selects the public check icon 1521 for the relevant contact and selects the confirmation icon 1525, the electronic apparatus 100 may provide the relevant contact in the information access control mode. When the user selects the cancellation icon 1523, the electronic apparatus 100 may re-display the screen illustrated in FIG. 15A.

Figure 16:
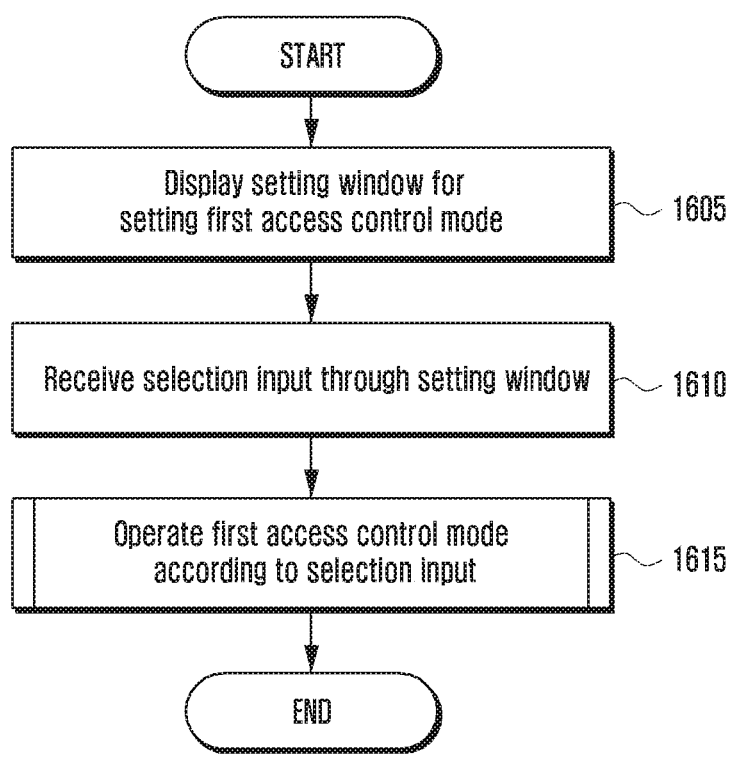
FIG. 16 is a flowchart illustrating an operation of an electronic apparatus for operating a first access control mode according to an embodiment of the present disclosure.

FIG. 16 is a flowchart illustrating an operation of an electronic apparatus for operating a first access control mode in such a manner as to set a first access control mode as various modes according to an embodiment of the present disclosure.

Referring to FIG. 16, in operation 1605, the electronic apparatus 100 may display a setting window for setting a first access control mode. For example, the information access control unit 175 may operate an application in such a manner as to apply a different first access control mode to the application for each step according to information on whether to be disclosed. The electronic apparatus 100 may display the setting window through the touch screen so as to receive a selection input for a mode for each step of the first access control mode.

In operation 1610, the electronic apparatus 100 may receive a selection input through the setting window. For example, the electronic apparatus 100 may receive from the user, an input for a particular operating mode displayed in the setting window and thereby may set the operating mode for the first access control mode.

In operation 1615, the electronic apparatus 100 may operate the first access control mode according to the selection input. A detailed operation of operating the first access control mode according to a selection input will be described with reference to FIG. 17.

Figure 17:
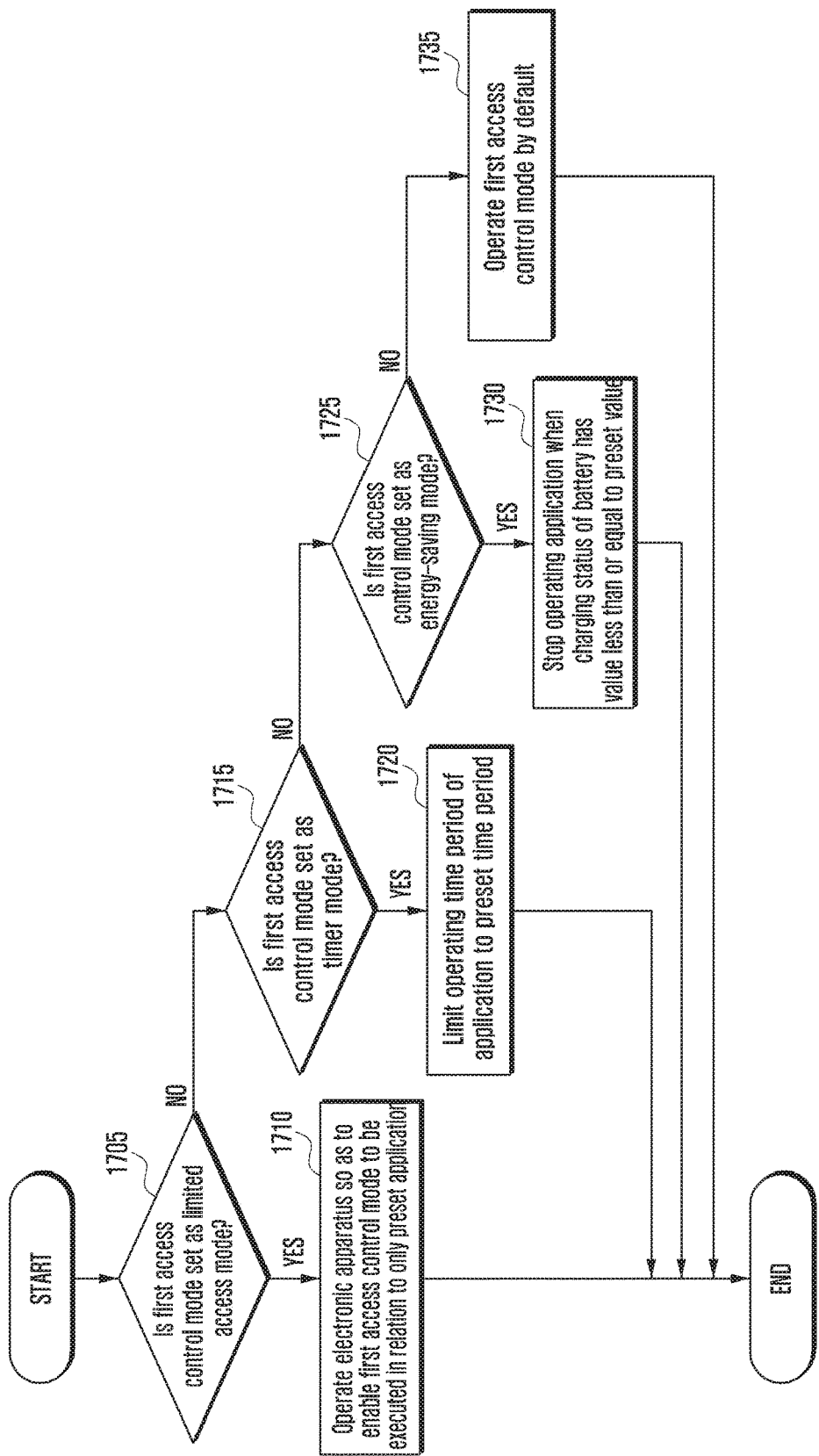
FIG. 17 is a flowchart illustrating detailed operations of FIG. 16 according to an embodiment of the present disclosure.

FIG. 17 is a flowchart illustrating detailed operations of an electronic apparatus illustrated in FIG. 16 according to an embodiment of the present disclosure.

FIG. 17 illustrates operations 1615 of FIG. 16 in greater detail. The operation illustrated in FIG. 17 is considered to be performed in a state where the electronic apparatus 100 is operated in a first information access control mode.

Referring to FIG. 17, in operation 1705, the electronic apparatus 100 may determine whether the first access control mode is set as a limited access mode. The limited access mode is a mode which limits the number of applications which may be used in the first access control mode. The user may set at least one of the number of applications and particular applications which may be used in the first access control mode. In addition, the electronic apparatus 100 may receive a setting input from the user and may generate and store an application list which may be used in the limited access mode.

When the first access control mode is set as the limited access mode, the electronic apparatus 100 may proceed to operation 1710 and may operate the respective elements of the electronic apparatus 100 so as to enable the first access control mode to be executed in relation to only a preset application. For example, when a first information access control mode input is received, the information access control unit 175 may operate the first information access control mode as the limited access mode. Accordingly, the information access control unit 175 may limitedly provide the execution of an application according to applications or the number of applications which is preset by the user. When the electronic apparatus 100 receives an execution input for an application different from the applications which are preset by the user, the electronic apparatus 100 may operate a lock mode. Further, the electronic apparatus 100 may also operate the lock mode when the electronic apparatus 100 executes or switches to applications, the number of which is greater than or equal to the number of applications which is preset by the user.

When the first access control mode is not set as the limited access mode, the electronic apparatus 100 may branch to operation 1715 and may determine whether the first access control mode is set as a timer mode. The timer mode is a mode which limits an operating time period of a particular application which may be used in the first access control mode. The user may limit an operating time period of the particular application to a particular time period in the first information access control mode. The electronic apparatus 100 may display a setting window for setting a time period as described above, may receive the particular time period as an input from the user, and may set a limited time period for the particular application.

When the first access control mode is set as the timer mode, the electronic apparatus 100 may proceed to operation 1720 and may operate the first access control mode in such a manner as to limit the operating time period of the application to a preset time period. For example, when a first information access control mode input is received, the information access control unit 175 may operate the first information access control mode as the timer mode. Accordingly, when the operating time period of the particular application is longer than or equal to the preset time period, the electronic apparatus 100 may stop providing the relevant application. For example, when the operating time period of the particular application becomes equal to the preset time period, the information access control unit 175 may stop providing the relevant application and may operate the electronic apparatus 100 in the lock mode.

When the first access control mode is not set as the timer mode, the electronic apparatus 100 may branch to operation 1725 and may determine whether the first access control mode is set as an energy-saving mode. The energy-saving mode is a mode which allows the provision of the application to be stopped and allows the electronic apparatus 100 to operate in the lock mode when, in the first access control mode, a battery charging status of the electronic apparatus 100 has a value which is less than or equal to a preset value. The user may set a particular battery charging value and the electronic apparatus 100 may store the set particular battery charging value in the storage unit 130.

When the first access control mode is set as the energy-saving mode, the electronic apparatus 100 may proceed to operation 1730 and may operate the first access control mode as the energy-saving mode. For example, when the charging status of the battery has a value less than or equal to the preset value while operating the particular application in the first access control mode, the control unit 170 may stop providing the relevant application and may operate the electronic apparatus 100 in the lock mode.

When the first access control mode is not set as the energy-saving mode, the electronic apparatus 100 may branch to operation 1735 and may operate the first access control mode by default. The operation of the first access control mode by default signifies the above-described operation of the first access control mode.

Figure 18A:
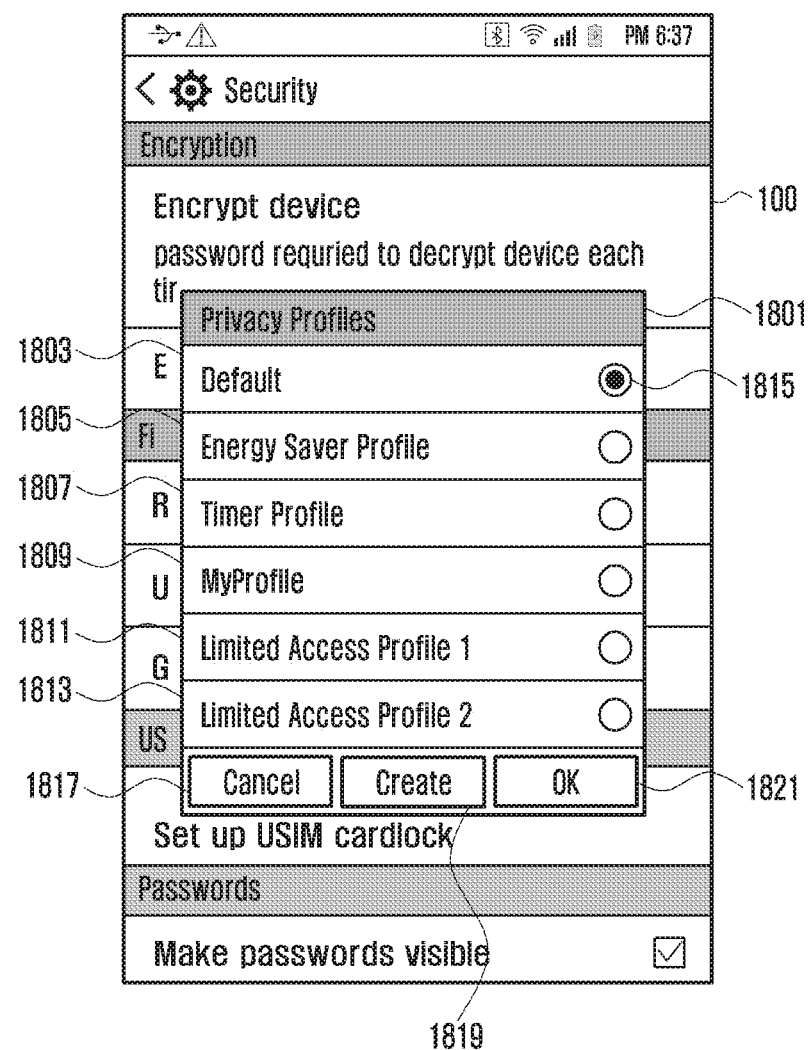
FIG. 18A is a view illustrating an example of an operation of displaying a setting window for setting a first access control mode in FIG. 16 according to an embodiment of the present disclosure.

FIG. 18A is a view illustrating an example of an operation of displaying a setting window for setting a first access control mode in FIG. 16 according to an embodiment of the present disclosure.

Figure 18B:
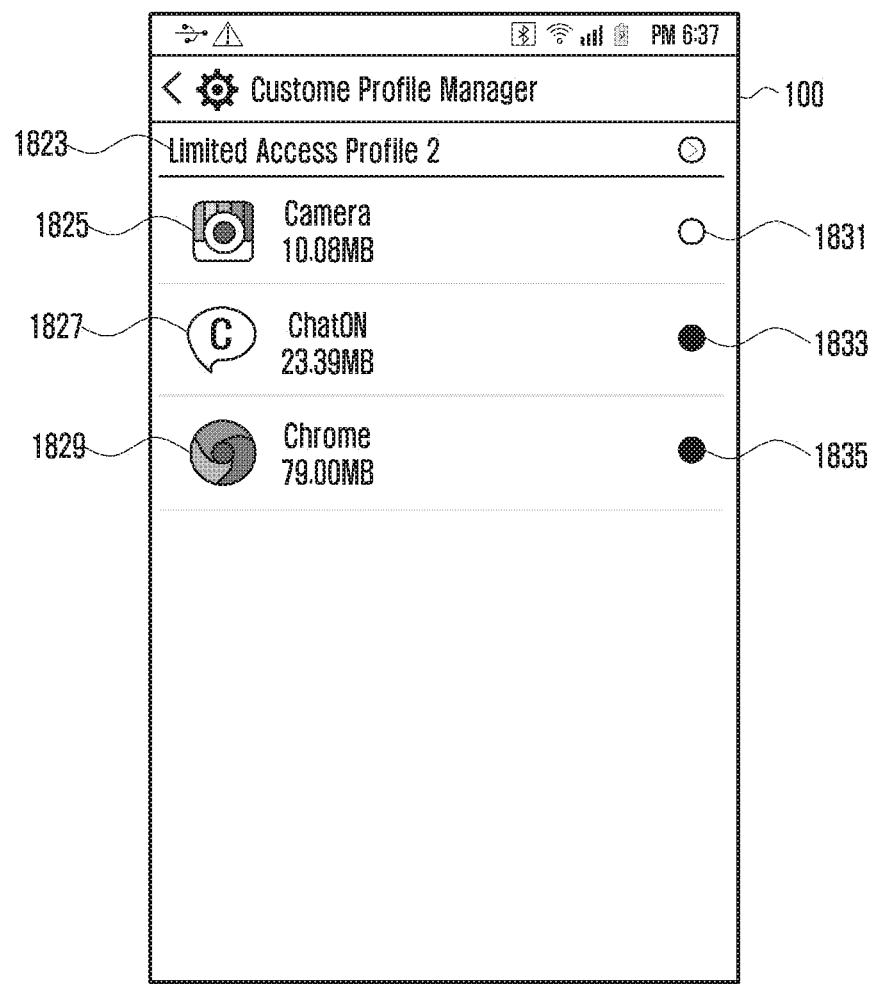
FIG. 18B is a view illustrating an example of an operation of displaying an application list which can be used in a limited access mode according to an embodiment of the present disclosure.

FIG. 18B is a view illustrating an example of an operation of an electronic apparatus for displaying an application list which can be used in a limited access mode according to an embodiment of the present disclosure.

Referring to FIG. 18A, a view is shown that illustrates a privacy profile window 1801 which receives as input, an inquiry about the selection of a specific operating scheme of the first access control mode. The privacy profile window 1801 may display a default mode area 1803, an energy-saving profile area 1805, a timer profile area 1807, a my profile area 1809, limited access profile areas 1811 and 1813, a cancellation icon 1817, a generation icon 1819, a confirmation icon 1821, and the like.

The electronic apparatus 100 may receive a particular operating mode for the first access control mode as input from the user through the privacy profile window 1801. For example, the electronic apparatus 100 may receive as an input, a check icon 1815 related to the default mode area 1803 and the confirmation icon 1821 and thereby may operate the relevant application in a default mode when a first access control mode input is received. The electronic apparatus 100 may receive as an input, a check icon related to the energy-saving profile area 1805 and the confirmation icon 1821 and thereby may operate the relevant application in an energy-saving mode when the first access control mode input is received. The electronic apparatus 100 may receive as an input, a check icon related to the timer profile area 1807 and the confirmation icon 1821 and thereby may operate the relevant application in a timer mode when the first access control mode input is received.

According to an embodiment of the present disclosure, when the electronic apparatus 100 receives as an input, a check icon related to the my profile area 1809 and the confirmation icon 1821, the electronic apparatus 100 may generate a list of applications which may be used in the first information access control mode. For example, when a my profile list includes a calculator application, a music application, a web browser application, and a dictionary application, the electronic apparatus 100 may allow switching from a particular application to at least one of the calculator application, the music application, the web browser application, or the dictionary application while the particular application is executed in the first information access control mode. When the electronic apparatus 100 receives an execution input for a message application which is an application which is not pre-designated, the electronic apparatus 100 may execute a lock mode. Accordingly, the user may use only limited information in the first information access control mode. The limited access profile areas 1811 and 1813 illustrated in FIG. 18A are application lists which are set through the my profile area 1809. The electronic apparatus 100 may receive as an input, check icons related to the limited access profile areas 1811 and 1813 and the confirmation icon 1821 and thereby may operate the relevant application in a limited access mode when a first access control mode input is received.

Referring to FIG. 18B, a view is shown that illustrates a configuration of a limited access profile 2 list 1823 from among application lists which are set through the my profile area 1809. The limited access profile 2 list 1823 includes a camera application 1825, a chatting application 1827, and a web browser application 1829. The electronic apparatus 100 may receive a setting as to whether the applications included in the list are activated through check icons 1831, 1833, and 1835 of the respective applications.

For example, when the user selects the check icon 1833 of the chatting application 1827 and the check icon 1835 of the web browser application 1829, applications that the user may use in the limited access mode are limited to the chatting application 1827 and the web browser application 1829. Accordingly, when the electronic apparatus 100 receives an execution input for an application other than the chatting application 1827 and the web browser application 1829, the electronic apparatus 100 may operate the lock mode. According to the above-described embodiments of the present disclosure, the user can more efficiently and variously operate the information access control mode.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method for controlling access to information by an electronic apparatus, the method comprising:
   obtaining a first user input from a current user for a first application among a plurality of applications on a touch screen of the electronic apparatus;
   when it is determined that the first user input is a first information access control mode input, limiting, by at least one processor of the electronic apparatus, execution of at least some of remaining applications among the plurality of applications except the first application based on the first user input;
   obtaining a second user input for executing a second application among the plurality of applications while an execution screen of the first application is being displayed, wherein the second application is different from the first application and is included in the at least some of the remaining applications; and
   based on the second user input for executing the second application among the plurality of applications, displaying a lock screen,
   wherein the limiting of the execution of the at least some of the remaining applications comprises:
   deactivating the at least some of the remaining applications except the first application, such that the deactivated applications cannot be executed,
   limiting an operating time period for the at least some of the remaining applications to a preset time period, and
   stopping the execution of the at least some of the remaining applications when a battery charging status of the electronic apparatus has a value less than or equal to a preset value.

2. The method of claim 1, further comprising:
   executing the first application in the first information access control mode when the first user input is the first information access control mode input;
      obtaining an information change request input for the first application during the execution of the first application; and limiting provision of information related to the first application according to the information change request input.

3. The method of claim 2, wherein the obtaining of the information change request input for the first application comprises at least one of obtaining an input for terminating the first application or obtaining an input for executing the second application among the plurality of applications that is different from the first application.

4. The method of claim 2, wherein the limiting of the provision of the information related to the first application comprises switching the electronic apparatus to a locked state.

5. The method of claim 2, wherein the first information access control mode input corresponds to a gesture input which is preset for the first application.

6. The method of claim 2, further comprising:
limiting provision of at least one piece of content among pieces of content related to the first application when the first user input is a second information access control mode input.

7. The method of claim 6, wherein the limiting of the provision of the at least one piece of content among the pieces of content comprises:
displaying first content of the first application,
obtaining an information change request input to change to second content different from the first content during the display of the first content, and
displaying preset public content when the second content is preset private content.

8. The method of claim 6, wherein the limiting of the provision of the at least one piece of content among the pieces of content comprises:
setting a selection input as to whether particular content provided by the first application can be disclosed, and
obtaining a selection input and providing the particular content according to the setting.

9. The method of claim 1, further comprising:
obtaining a selection input for the first application from the current user on the touch screen;
displaying a function icon for executing the first application in the first information access control mode according to the selection input when the first user input is the first information access control mode input; and
recognizing a user input for the function icon as the first information access control mode input.

10. The method of claim 1, wherein the limiting of the execution of the at least some of the remaining applications further comprises providing the first information access control mode configured to be executed in relation to only preset applications.

11. The method of claim 1, wherein the limiting of the execution of the at least some of the remaining applications comprises limiting an operating time period for the first application to the preset time period.

12. An electronic apparatus comprising:
a touch screen; and
at least one processor connected to the touch screen,
wherein the at least one processor is configured to:
obtain a first user input from a current user for a first application among a plurality of applications through the touch screen,
when it is determined that the first user input is a first information access control mode input, limit execution of at least some of remaining applications among the plurality of applications except the first application based on the first user input,
obtain a second input for executing a second application among the plurality of applications while an execution screen of the first application is being displayed, wherein the second application is different from the first application and is included in the at least some of the remaining applications, and
based on the second input for executing the second application among the plurality of applications, control the touch screen to display a lock screen, and wherein the limiting of the execution of the at least some of the remaining applications comprises:
deactivating the at least some of the remaining applications except the first application, such that the deactivated applications cannot be executed,
limiting an operating time period for the at least some of the remaining applications to a preset time period, and
stopping the execution of the at least some of the remaining applications when a battery charging status of the electronic apparatus has a value less than or equal to a preset value.

13. The electronic apparatus of claim 12, wherein the at least one processor is further configured to:
execute the first application in the first information access control mode when the first user input is the first information access control mode input, and
control the electronic apparatus to be switched to a locked state when an input for terminating the first application is obtained during the execution of the first application or when an input for executing the second application among the plurality of applications that is different from the first application is obtained.

14. The electronic apparatus of claim 13,
wherein the first information access control mode input corresponds to a preset gesture input, and
wherein the at least one processor is further configured to:
obtain a selection input for the first application from the current user on the touch screen,
display a function icon for executing the first application in the first information access control mode according to the selection input,
obtain a user input for the function icon, and
recognize the user input for the function icon as the first information access control mode input.

15. The electronic apparatus of claim 13, wherein the at least one processor is further configured to limit provision of at least one piece of content among pieces of content related to the first application when the first user input is a second information access control mode input.

16. The electronic apparatus of claim 15, wherein, to limit the provision of the at least one piece of content among the pieces of content, the at least one processor is further configured to:
obtain an information change request input to change to second content different from the first content during the display of the first content, and
display preset public content when the second content is preset private content.

17. The electronic apparatus of claim 15, wherein, to limit the provision of the at least one piece of content among the pieces of content, the at least one processor is further configured to:
set a selection input as to whether particular content provided by the first application can be disclosed, and
obtain a selection input and provide the particular content according to the setting.

18. The electronic apparatus of claim 12, wherein the at least one processor is further configured to:
  control the electronic apparatus to be capable of executing the first information access control mode in relation to only preset applications.

19. The electronic apparatus of claim 12, wherein the at least one processor is further configured to limit an operating time period for the first application to the preset time period.

\* \* \* \* \*